United States Patent
Kim et al.

(10) Patent No.: US 10,620,306 B2
(45) Date of Patent: Apr. 14, 2020

(54) VEHICLE RADAR APPARATUS FOR PROVIDING THREE-DIMENSIONAL INFORMATION

(71) Applicant: SAMSUNG ELECTRONICS CO., LTD., Suwon-si (KR)

(72) Inventors: Jongseok Kim, Hwaseong-si (KR); Jungwoo Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 314 days.

(21) Appl. No.: 15/658,633

(22) Filed: Jul. 25, 2017

(65) Prior Publication Data

US 2018/0149737 A1    May 31, 2018

(30) Foreign Application Priority Data

Nov. 30, 2016 (KR) ........................ 10-2016-0162296

(51) Int. Cl.
  *G01S 13/42*  (2006.01)
  *G01S 13/89*  (2006.01)
  (Continued)

(52) U.S. Cl.
  CPC ............ *G01S 13/426* (2013.01); *G01S 13/89* (2013.01); *G01S 13/931* (2013.01);
  (Continued)

(58) Field of Classification Search
  CPC combination set(s) only.
  See application file for complete search history.

(56) References Cited

U.S. PATENT DOCUMENTS

| 6,535,162 B1 | 3/2003 | Butler |
| 7,561,096 B2 | 7/2009 | Hellsten |

(Continued)

FOREIGN PATENT DOCUMENTS

| EP | 2 857 858 A1 | 4/2015 |
| JP | 5080795 B2 | 11/2012 |

(Continued)

OTHER PUBLICATIONS

Communication dated Mar. 8, 2018, issued by the European Patent Office in counterpart European application No. 17184487.1.

*Primary Examiner* — Mamadou L Diallo

(74) *Attorney, Agent, or Firm* — Sughrue Mion, PLLC

(57) ABSTRACT

Provided is a vehicle radar apparatus for providing three-dimensional (3D) information about an environment. The vehicle radar apparatus may include a transmitter configured to transmit electromagnetic waves, a receiver configured to receive reflected electromagnetic waves, and a signal processor configured to extract 3D information about the environment based on the reflected electromagnetic waves. The transmitter may transmit electromagnetic waves to the environment by performing a two-dimensional (2D) scan, and the receiver may receive the reflected electromagnetic waves by performing a one-dimensional (1D) scan. Alternatively, the transmitter may transmit the electromagnetic waves to the environment by performing a 1D scan, and the receiver may receive the reflected electromagnetic waves by performing a 2D scan.

25 Claims, 19 Drawing Sheets

(51) Int. Cl.
  *G01S 13/93* (2020.01)
  *H01Q 1/32* (2006.01)
  *H01Q 21/06* (2006.01)
  *G01S 13/931* (2020.01)
  G01S 13/02 (2006.01)
  H01Q 3/36 (2006.01)

(52) U.S. Cl.
  CPC ......... *H01Q 1/3233* (2013.01); *H01Q 21/061* (2013.01); *G01S 2013/0245* (2013.01); *G01S 2013/0254* (2013.01); *G01S 2013/9375* (2013.01); *H01Q 3/36* (2013.01)

(56) References Cited

U.S. PATENT DOCUMENTS

| | | |
|---|---|---|
| 7,605,746 B2 | 10/2009 | Matsuura et al. |
| 8,471,759 B2 | 6/2013 | Sun et al. |
| 2010/0141527 A1 | 6/2010 | Lalezari |
| 2011/0285577 A1 | 11/2011 | Sun et al. |
| 2011/0304498 A1* | 12/2011 | Yanagihara ............. G01S 7/412 342/70 |
| 2012/0313811 A1 | 12/2012 | Suzuki |
| 2014/0285375 A1 | 9/2014 | Crain |
| 2016/0047883 A1 | 2/2016 | Baker et al. |

FOREIGN PATENT DOCUMENTS

| | | |
|---|---|---|
| JP | 2015222234 A | 12/2015 |
| KR | 1020090047369 A | 5/2009 |

\* cited by examiner

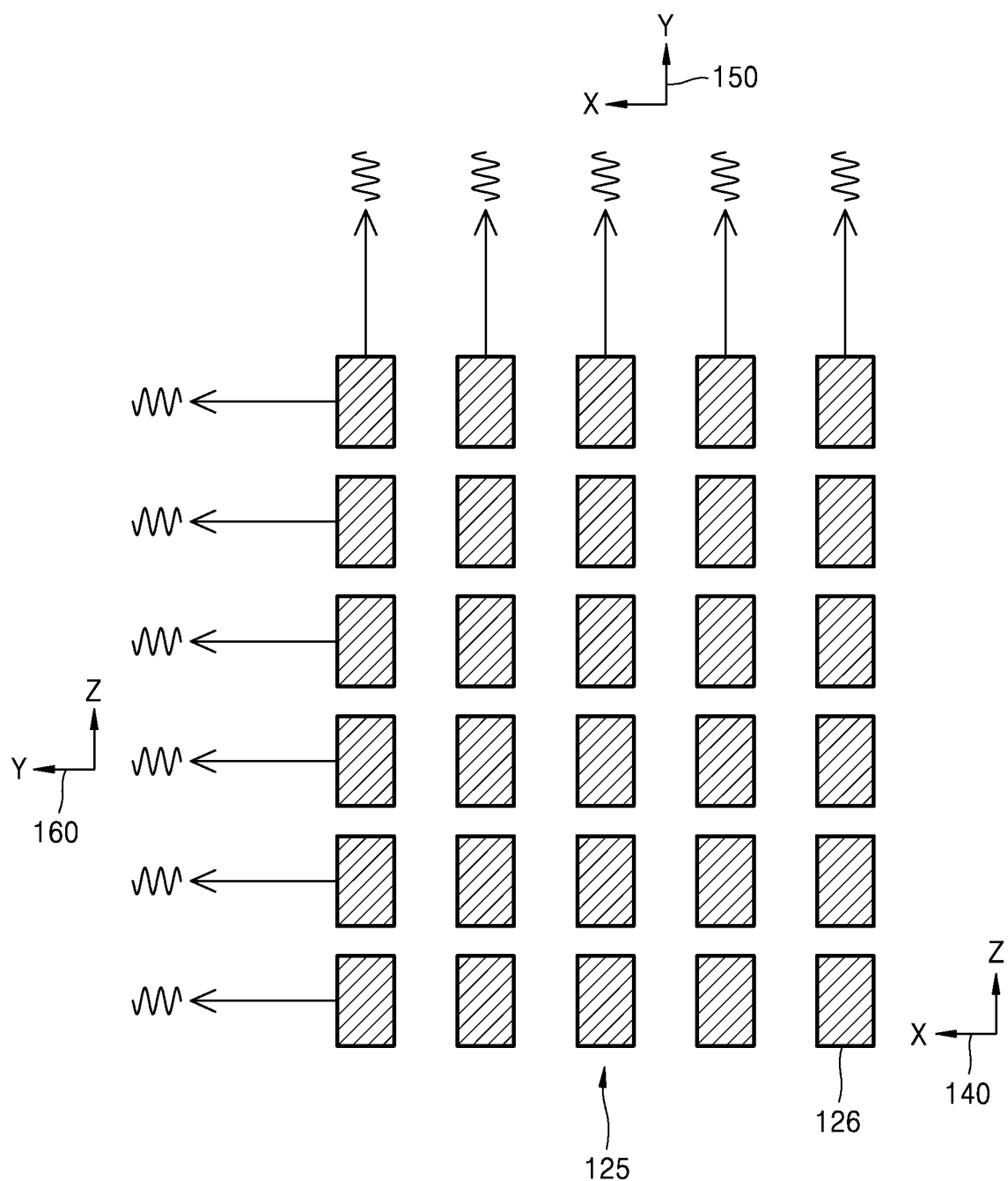

VEHICLE RADAR APPARATUS FOR PROVIDING THREE-DIMENSIONAL INFORMATION

CROSS-REFERENCE TO RELATED APPLICATION

This application claims priority from Korean Patent Application No. 10-2016-0162296, filed on Nov. 30, 2016, in the Korean Intellectual Property Office, the disclosure of which is incorporated herein in its entirety by reference.

BACKGROUND

1. Field

The present disclosure relates to vehicle radar apparatuses, and more particularly, to vehicle radar apparatuses for providing three-dimensional (3D) information about a surrounding environment.

2. Description of the Related Art

Advanced driving assistance systems (ADAS) having various functions have recently been commercialized. For example, the number of vehicles with various functions such as adaptive cruise control (ACC) or autonomous emergency braking system (AEB) is increasing. ACC allows recognition of positions and speeds of vehicles ahead, slows a vehicle when there is a risk of collision, and maintains a speed of the vehicle within a predetermined speed range when there is no risk of collision. AEB allows recognition of vehicles ahead and prevents a collision by automatically braking when there is a risk of collision but the driver fails to take an appropriate action. In addition, fully autonomous vehicles are expected to be commercially available to the general public in the near future. Accordingly, there is a renewed interest in vehicle radar apparatuses for providing reliable forward information. Conventional vehicle radar apparatuses mainly provide two-dimensional (2D) information about, for example, a distance, a relative speed, and an azimuth angle of an object ahead.

SUMMARY

According to an aspect of an exemplary embodiment, a vehicle radar apparatus may include: a transmitter configured to transmit electromagnetic waves to an environment by performing a two-dimensional (2D) scan; a receiver configured to receive reflected electromagnetic waves by performing a one-dimensional (1D) scan; and a signal processor configured to extract three-dimensional (3D) information about the environment based on the reflected electromagnetic waves received by the receiver.

The transmitter may be further configured to sequentially transmit the electromagnetic waves a first plurality of times in a first direction in a first area within the environment and sequentially transmit the electromagnetic waves a second plurality of times in the first direction in a second area within the environment, the second area being adjacent to the first area along a second direction perpendicular to the first direction. The receiver may be further configured to receive the reflected electromagnetic waves from the first area while the transmitter sequentially scans the electromagnetic waves to the first area, and receive the reflected electromagnetic waves from the second area while the transmitter sequentially scans the electromagnetic waves to the second area.

The signal processor may be further configured to control the transmitter to transmit the electromagnetic waves to an area within the environment, and control the receiver to receive the reflected electromagnetic waves from the area.

The transmitter may include: a transmitting antenna array including a plurality of transmitting antenna elements arranged in a 2D formation; a transmitting circuit configured to respectively apply transmission signals to the plurality of transmitting antenna elements; and a plurality of delay devices connected between the transmitting circuit and the plurality of transmitting antenna elements. The plurality of delay devices may be configured to delay the transmission signals applied from the transmitting circuit and respectively transmit the delayed transmission signals to the transmitting antenna elements.

The plurality of delay devices may be further configured to delay the transmission signals by different delay amounts according to respective positions of the plurality of transmitting antenna elements.

The plurality of transmitting antenna elements and the plurality of delay devices may be arranged in a 2D formation in a first direction and a second direction. The plurality of delay devices arranged in the first direction are configured to delay the transmission signals so that while the transmitter sequentially transmits the electromagnetic waves in the first direction, phases of the electromagnetic waves output from the plurality of transmitting antenna elements arranged in the first direction are sequentially changed.

The transmitter may include: a transmitting antenna array including a plurality of transmitting antenna elements arranged in a 2D formation; and a plurality of independent transmitting circuits respectively connected to the plurality of transmitting antenna elements and configured to respectively apply transmission signals to the plurality of transmitting antenna elements. The plurality of independent transmitting circuits may be further configured to respectively apply the transmission signals having different phases to the plurality of transmitting antenna elements.

The plurality of independent transmitting circuits may be further configured to respectively apply the transmission signals having the different phases to the plurality of transmitting antenna elements according to respective positions of the plurality of transmitting antenna elements.

The plurality of transmitting antenna elements may be arranged in the 2D formation in a first direction and a second direction. The plurality of independent transmitting circuits are configured to respectively apply transmission signals to the plurality of transmitting antenna elements so that while the transmitter sequentially transmits the electromagnetic waves in the first direction, phases of the electromagnetic waves output from the plurality of transmitting antenna elements arranged in the first direction are sequentially changed.

The receiver may include: a receiving antenna array including a plurality of receiving antenna elements arranged in a 2D formation; and a receiving circuit connected to each of the plurality of receiving antenna elements and configured to transmit signals, received from the plurality of receiving antenna elements, to the signal processor.

The plurality of receiving antenna elements may be arranged in a first direction and a second direction. The plurality of receiving antenna elements arranged in the first direction may be electrically connected to one another.

The receiving circuit may include a plurality of independent receiving circuits respectively connected to the plurality of receiving antenna elements arranged in the second direction.

The signal processor may be further configured to extract the 3D information by performing digital beamforming using the signals transmitted by the plurality of independent receiving circuits.

The receiver may further include a plurality of delay devices respectively connected to the plurality of receiving antenna elements arranged in the second direction. The plurality of delay devices are configured to delay signals received from the plurality of receiving antenna elements arranged in the second direction by different delay amounts.

The 3D information extracted by the signal processor may include at least one of a distance to an object in the environment, an azimuth angle of the object, a relative speed of the object with respect to the vehicle radar apparatus, and a height of the object.

According to an aspect of an exemplary embodiment, a radar apparatus may include: a transmitter configured to transmit electromagnetic waves to an environment by performing a one-dimensional (1D) scan; a receiver configured to receive reflected electromagnetic waves by performing a two-dimensional (2D) scan; and a signal processor configured to extract three-dimensional (3D) information about the environment based on the reflected electromagnetic waves received by the receiver.

The transmitter may be further configured to simultaneously transmit the electromagnetic waves to a first area extending in a first direction within the environment, and simultaneously transmit the electromagnetic waves to a second area extending in the first direction within the environment, the second area being adjacent to the first area along a second direction perpendicular to the first direction. The receiver may be further configured to sequentially receive the reflected electromagnetic waves a first plurality of times in the first direction in the first area while the transmitter transmits the electromagnetic waves to the first area, and sequentially receive the reflected electromagnetic waves a second plurality of times in the first direction in the second area while the transmitter transmits the electromagnetic waves to the second area.

The transmitter may include: a transmitting antenna array including a plurality of transmitting antenna elements arranged in a 2D formation; a transmitting circuit configured to apply transmission signals to the plurality of transmitting antenna elements; and a plurality of delay devices connected between the transmitting circuit and the plurality of transmitting antenna elements. The plurality of delay devices may be configured to delay the transmission signals applied from the transmitting circuit and respectively transmit the delayed transmission signals to the plurality of transmitting antenna elements, and delay the transmission signals by different delay amounts according to respective positions of the plurality of transmitting antenna elements.

The plurality of transmitting antenna elements may be arranged in the 2D formation in a first direction and a second direction. The plurality of transmitting antenna elements arranged in the first direction may be electrically connected to one another. The plurality of delay devices may be respectively connected to the plurality of transmitting antenna elements arranged in the second direction.

The receiver may include: a receiving antenna array including a plurality of receiving antenna elements arranged in a 2D formation; and a receiving circuit connected to each of the plurality of receiving antenna elements and configured to transmit signals, received from the plurality of receiving antenna elements, to the signal processor.

The plurality of receiving antenna elements may be arranged in the 2D formation in a first direction and a second direction. The plurality of receiving antenna elements are further configured to independently receive electromagnetic waves.

The receiving circuit may further include a plurality of independent receiving circuits respectively connected to the plurality of receiving antenna elements arranged in the 2D formation.

The receiver may further include a plurality of delay devices respectively connected to the plurality of receiving antenna elements arranged in the 2D formation. The plurality of delay devices are configured to delay the signals received from the plurality of receiving antenna elements by different delay amounts.

BRIEF DESCRIPTION OF THE DRAWINGS

The above and/or other aspects will become apparent and more readily appreciated from the following description of various exemplary embodiments, taken in conjunction with the accompanying drawings in which:

FIGS. 3A through 3C are diagrams illustrating an operation of a transmitting antenna array for scanning electromagnetic beams according to an exemplary embodiment;

DETAILED DESCRIPTION

Figure 1:
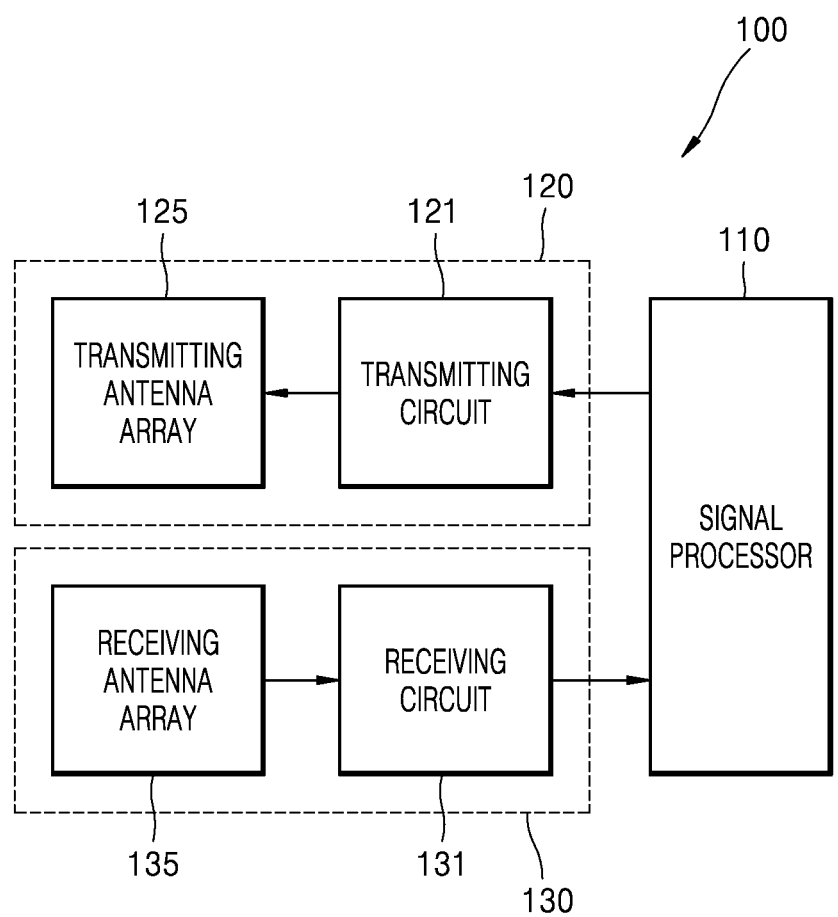
FIG. 1 is a block diagram illustrating a configuration of a vehicle radar apparatus according to an exemplary embodiment.

The present disclosure will now be described more fully with reference to the accompanying drawings, in which embodiments are shown. In the drawings, the same reference numerals denote the same elements and thicknesses of elements may be exaggerated for clarity and convenience of explanation. The present disclosure may, however, be embodied in different forms and should not be construed as limited to the exemplary embodiments set forth herein. It will also be understood that when a layer is referred to as being "on" another layer, it can be directly on the other layer, or intervening layers may also be present therebetween.

FIG. 1 is a block diagram illustrating a configuration of a vehicle radar apparatus 100 according to an exemplary embodiment. As shown in FIG. 1, the vehicle radar apparatus 100 according to an aspect of an exemplary embodiment may include a transmitter 120 that transmits electromagnetic waves to a surrounding environment (e.g., a forward environment, a rear environment, etc.), a receiver 130 that receives electromagnetic waves reflected from the surrounding environment, and a signal processor 110 that extracts information about the forward environment based on the received electromagnetic waves. The transmitter 120 may include a transmitting antenna array 125 that includes a plurality of transmitting antenna elements arranged in a two-dimensional (2D) form and a transmitting circuit 121 that applies a transmission signal to each of the plurality of transmitting antenna elements according to the control of the signal processor 110. Also, the receiver 130 may include a receiving antenna array 135 that includes a plurality of receiving antenna elements arranged in a 2D formation and a receiving circuit 131 that is connected to each of the plurality of receiving antenna elements and transmits a signal received from each of the plurality of receiving antenna elements to the signal processor 110. Although the signal processor 110, the transmitting circuit 121, and the receiving circuit 131 are illustrated as separate elements in FIG. 1, two or more of the signal processor 110, the transmitting circuit 121, and the receiving circuit 131 may be provided as one semiconductor chip. Alternatively, the signal processor 110, the transmitting circuit 121, and the receiving circuit 131 may be provided on one printed circuit board (PCB).

The transmitter 120 may transmit electromagnetic waves to a forward environment by using a 2D scanning method. To this end, the transmitter 120 may sequentially scan electromagnetic beams, which are focused on a narrow area, to 2D forward areas at predetermined time intervals. The receiver 130 may receive electromagnetic waves reflected from the forward environment in a one-dimensional (1D) scanning method. The signal processor 110 may extract three-dimensional (3D) information about the forward environment based on the electromagnetic wave signals received by the receiver 130 during one frame. For example, the signal processor 110 may extract information about a distance to an object ahead (hereby referred to as the front object), an azimuth angle of the front object, a relative speed of the front object, and a height of the front object.

Figure 2A:
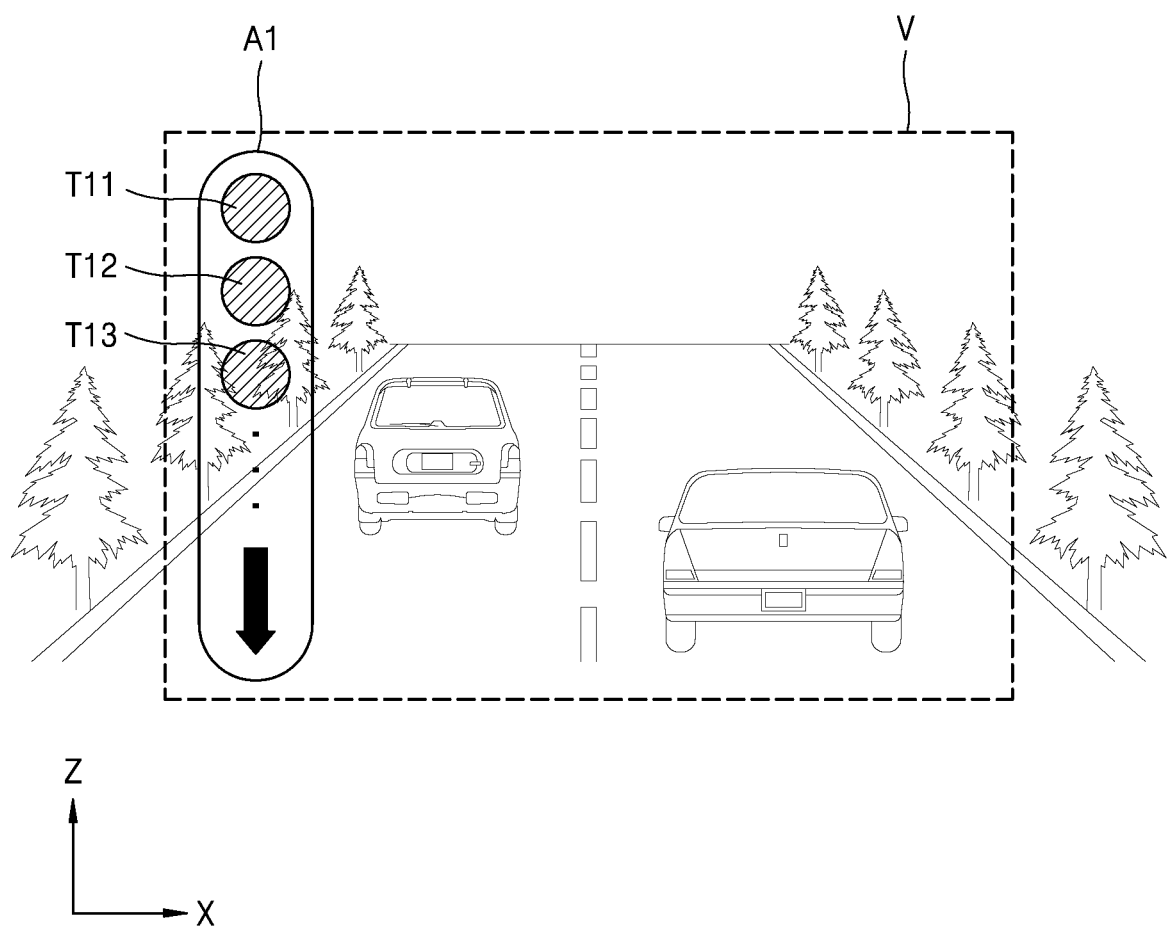
FIGS. 2A through 2C are views illustrating a process performed by the vehicle radar apparatus of FIG. 1 to scan electromagnetic beams to a forward environment according to an exemplary embodiment.
Figure 2B:
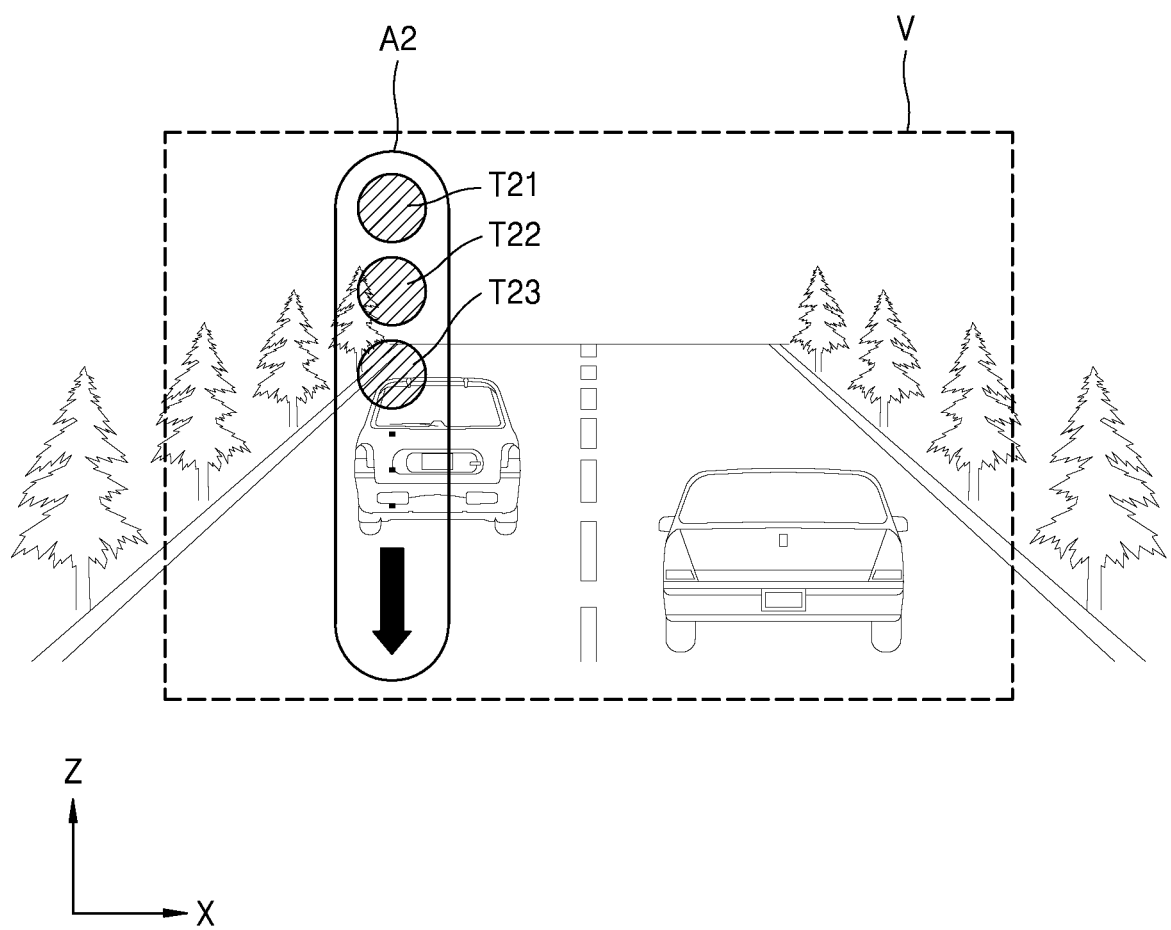
Figure 2C:
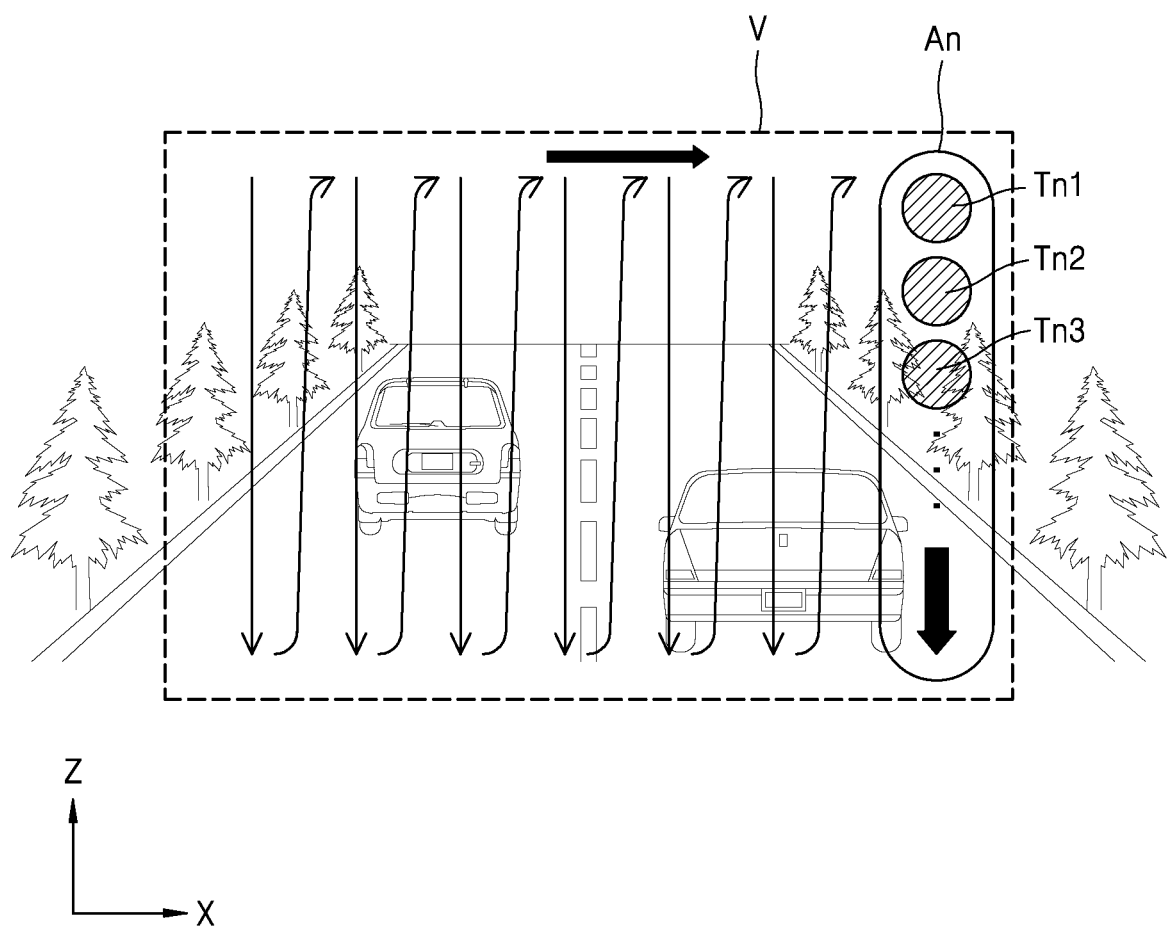

For example, FIGS. 2A through 2C are views illustrating a process performed by the vehicle radar apparatus 100 of FIG. 1 to scan electromagnetic beams to a forward environment according to an exemplary embodiment. First, as shown in FIG. 2A, the transmitter 120 of the vehicle radar apparatus 100 may select a first area A1 in a forward view V and may sequentially scan electromagnetic beams T11, T12, T13, etc. a plurality of times in one direction in the first area A1. For example, the first area A1 may be located on a left edge of the forward view V and may extend in a vertical direction. In other words, the first area A1 may extend in a z direction. The transmitter 120 may sequentially scan the electromagnetic beams T11, T12, T13, etc., for example, from the top to the bottom in the first area A1 (i.e., in a -z direction) or from the bottom to the top (i.e., in a +z direction).

After the scanning of the electromagnetic beams in the first area A1 is completed, as shown in FIG. 2B, the transmitter 120 may select a second area A2 longitudinally adjacent to the first area A1 and may sequentially scan electromagnetic beams T21, T22, T23, etc. a plurality of times in one direction in the second area A2. For example, the transmitter 120 may move from the first area A1 in a +x direction perpendicular to the z direction and may sequentially scan the electromagnetic beams T21, T22, and T23 from the top to the bottom (i.e., in the -z direction) in the second area A2 or from the bottom to the top (i.e., in the +z direction).

The transmitter 120 may sequentially scan the forward view V with beams in this manner. Finally, as shown in FIG. 2C, the transmitter 120 may complete the scanning of the forward view V during one frame by sequentially scanning electromagnetic beams Tn1, Tn2, Tn3, etc. from the top to the bottom (i.e., in the -z direction) or from the bottom to the top (i.e., in the +z direction) in an n-th area An that is located on a right edge of the forward view V and extends in the z direction. For example, one frame of a forward view image may correspond to about 50 ms of time. In other words, the frame rate may be about 20 Hz. Although electromagnetic beams are scanned from the top to the bottom and from the left to the right of the forward view V in the exemplary embodiment illustrated in FIGS. 2A through 2C, exemplary embodiments are not limited thereto. For example, electromagnetic beams may be scanned from the bottom to the top and from the right to the left. Alternatively, electromagnetic beams may be scanned in the horizontal direction on an upper portion of the forward view V and then may be scanned in the horizontal direction on a lower portion of the forward view V.

Figure 3A:
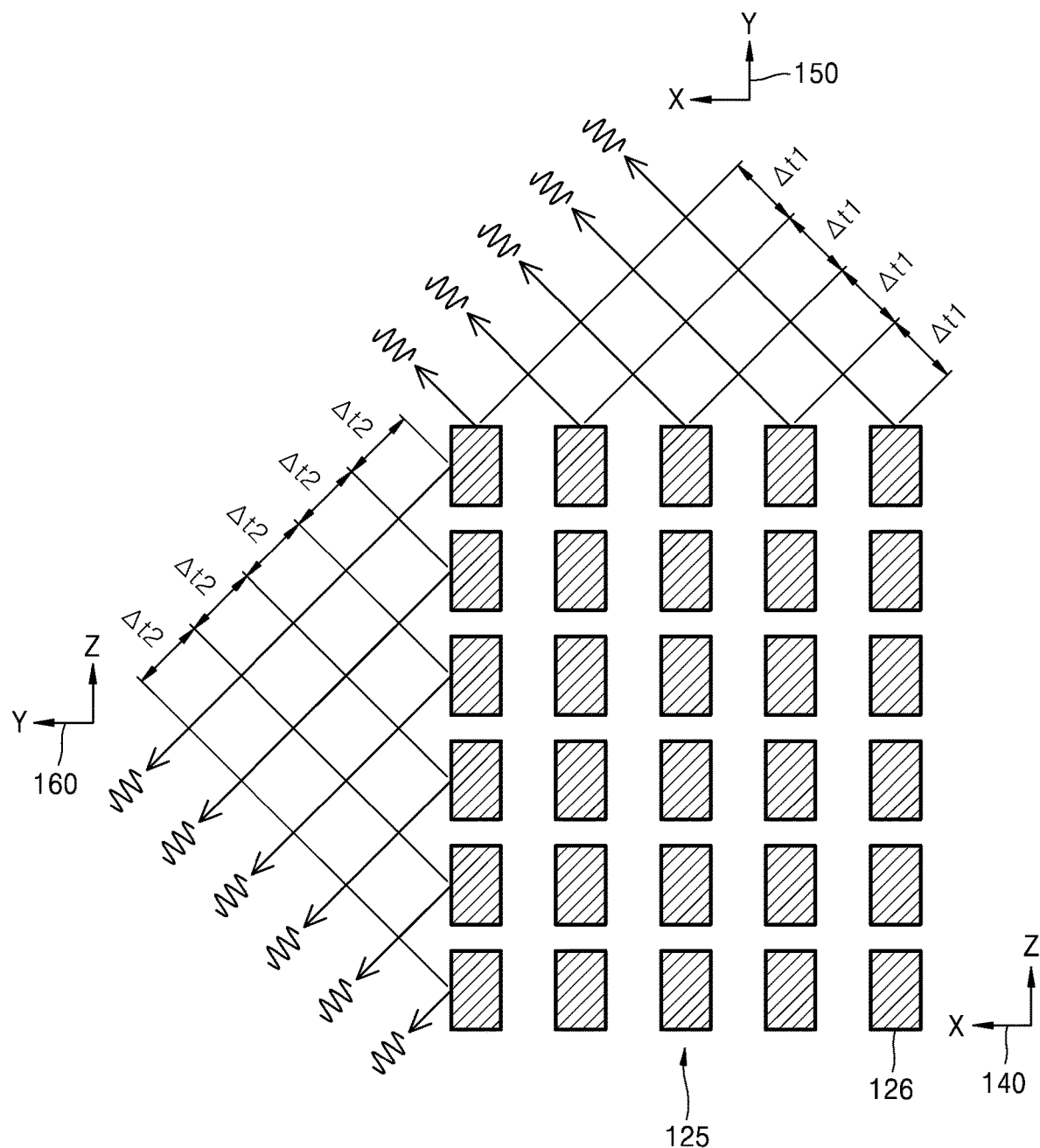
Figure 3C:
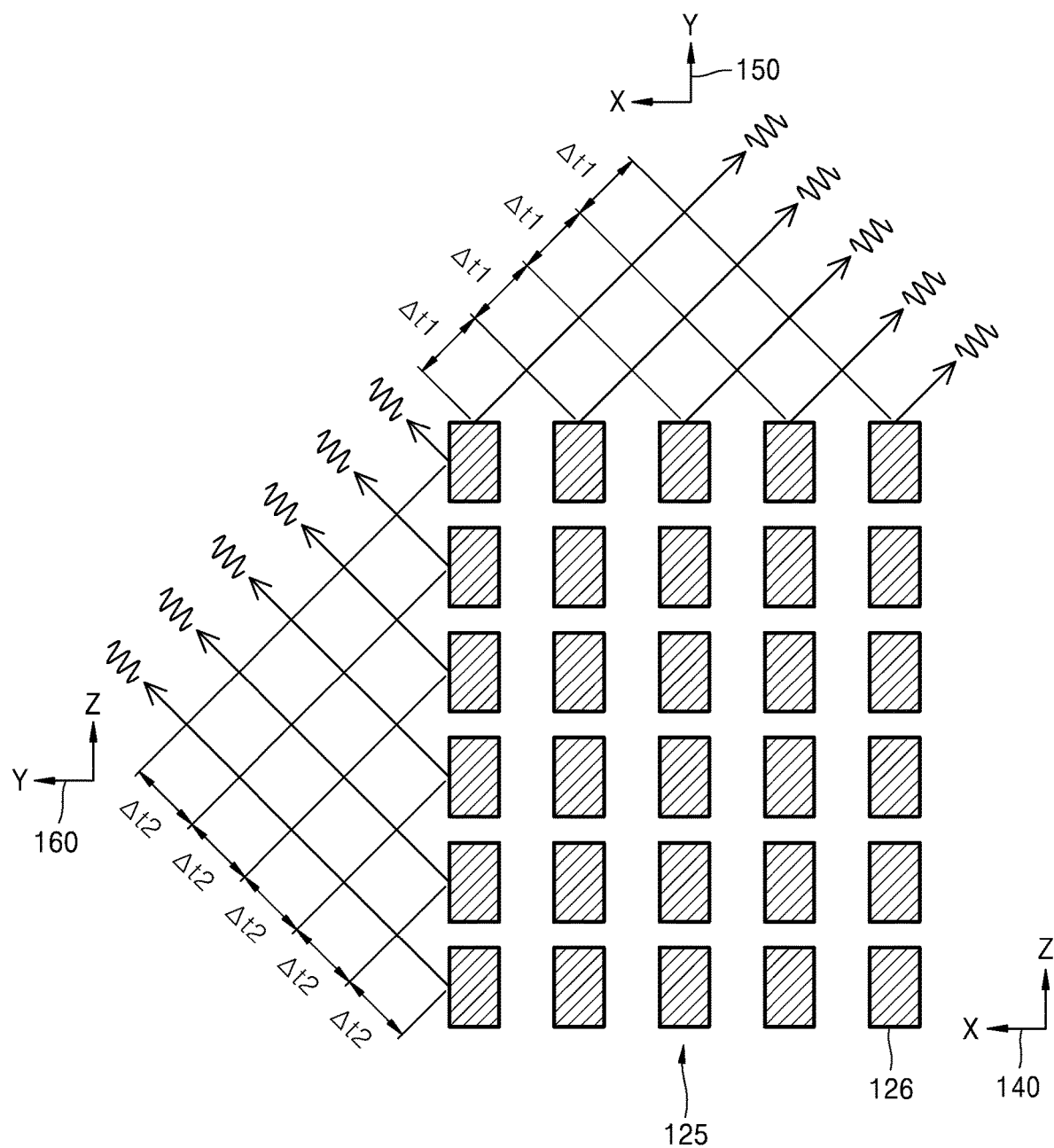

In order to transmit electromagnetic waves by using the above-described 2D-scanning method, the transmitting antenna array 125 may include a plurality of transmitting antenna elements arranged in a 2D formation. For example, FIGS. 3A through 3C are diagrams illustrating an operation of the transmitting antenna array 125 for scanning electromagnetic beams according to an exemplary embodiment. As shown in FIG. 3A, the transmitting antenna array 125 may include a plurality of transmitting antenna elements 126 arranged in a 2D formation along a plurality of rows and a plurality of columns. In this illustration, the plurality of rows are arranged along the X axis, and the plurality of columns are arranged among the Z axis, as indicated by a direction guide 140. In this structure, directions of electromagnetic beams emitted from the transmitting antenna array 125 may be controlled according to a difference between times at which electromagnetic waves are respectively emitted from the transmitting antenna elements 126 (or a phase difference between the electromagnetic waves respectively emitted from the transmitting antenna elements 126). In detail, propagation directions of electromagnetic beams may be controlled in a horizontal direction (i.e., along an X axis) according to a difference $\Delta t1$ between times at which electromagnetic waves are emitted from the transmitting antenna elements 126 arranged along the same row, and propagation directions of electromagnetic beams may be controlled in a vertical direction (i.e., along a Z axis) according to a difference $\Delta t2$ between times at which electromagnetic waves are emitted from the transmitting antenna elements 126 arranged along the same column.

For example, as shown in FIG. 3A, when an electromagnetic wave is emitted from the transmitting antenna element 126 located at a rightmost position (i.e., furthest position in the -X direction) in the same row first and an electromagnetic wave is emitted from the transmitting antenna element 126 located at a leftmost position (i.e., furthest position in the +X direction) last, an electromagnetic beam propagates leftward (i.e., +X direction). In other words, the electromagnetic beam propagates toward the side of the transmitting antenna element 126 that subsequently outputs an electromagnetic wave. This is illustrated in FIG. 3A with arrows abutting the top of the antenna array 125. These arrows represent the electromagnetic beams' orientation in a cross-sectional plane defined by the X and Y axes, as indicated by a direction guide 150. An azimuth direction in which the electromagnetic beam propagates may be determined by the difference $\Delta t1$ (e.g., time intervals) between the times at which electromagnetic waves are emitted from two adjacent transmitting antenna elements 126 in the same row or a phase difference between electromagnetic waves emitted from two adjacent transmitting antenna elements 126 in the same row. If the difference $\Delta t1$ increases, the electromagnetic beam propagates further leftward (i.e., +X direction), and if the difference $\Delta t1$ decreases, the electromagnetic beam propagates more towards the front (i.e., +Y direction). The "front" may refer to the direction that is orthogonal to the plane in which the antenna array 125 are positioned.

Also, when an electromagnetic wave is emitted from the transmitting antenna element 126 located at an uppermost position (i.e., furthest position in the +Z direction) in the same column first and an electromagnetic wave is emitted from the transmitting antenna element 126 located at a lowermost position (i.e., furthest position in the −Z direction) last, an electromagnetic beam propagates downward (i.e., −Z direction). This is illustrated in FIG. 3A with arrows abutting the left side of the antenna array 125. These arrows represent the electromagnetic beams' orientation in a cross-sectional plane defined by the Y and Z axes, as indicated by a direction guide 160. An elevation direction in which the electromagnetic beam propagates may be determined by the difference $\Delta t2$ between times at which electromagnetic waves are emitted from two adjacent transmitting antenna elements 126 in the same column or a phase difference between electromagnetic waves emitted from two adjacent transmitting antenna elements 126 in the same column. If the difference $\Delta t2$ increases, the electromagnetic beam propagates further downward (i.e., −Z direction), and if the difference $\Delta t2$ decreases, the electromagnetic beam propagates more towards the front (i.e., in a +Y direction).

Referring to FIG. 3B, when $\Delta t1=0$ and $\Delta t2=0$, an electromagnetic beam emitted from the transmitting antenna array 125 propagates straight toward the front (i.e., +Y direction). Also, referring to FIG. 3C, when an electromagnetic wave is emitted first from the transmitting antenna element 126 located at a leftmost position (i.e., furthest position in the +X direction) in the same row and an electromagnetic wave is last emitted from the transmitting antenna element 126 located at a rightmost position (i.e., furthest position in the −X direction), an electromagnetic beam propagates rightward (i.e., −X direction). When an electromagnetic wave is emitted first from the transmitting antenna element 126 located at a lowermost position in the same column and an electromagnetic wave is emitted last from the transmitting antenna element 126 located at an uppermost position, an electromagnetic beam propagates upward. Accordingly, an electromagnetic beam may be scanned two-dimensionally as shown in FIGS. 2A through 2C by individually controlling the times at which electromagnetic waves are emitted from the plurality of transmitting antenna elements 126 of the transmitting antenna array 125 or phases of electromagnetic waves emitted from the plurality of transmitting antenna elements 126.

Figure 4:
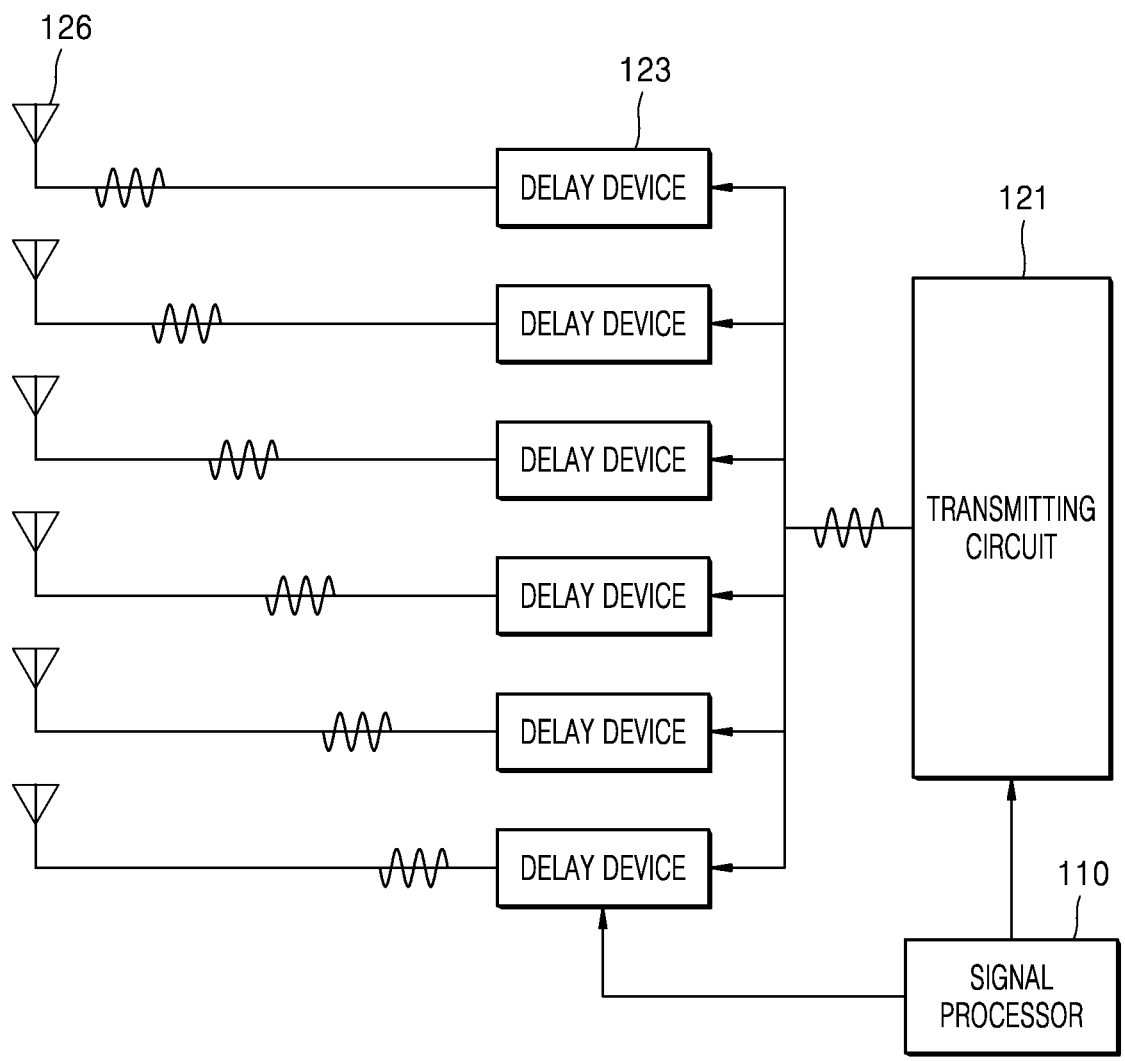
FIG. 4 is a block diagram illustrating a configuration of a transmitter according to an exemplary embodiment.

To this end, the transmitter 120 may be configured so that the plurality of transmitting antenna elements 126 independently emit electromagnetic waves. For example, FIG. 4 is a block diagram illustrating a configuration of the transmitter 120 according to an exemplary embodiment. In FIG. 4, the transmitter 120 may further include a plurality of delay devices 123 connected between the transmitting circuit 121 and the plurality of transmitting antenna elements 126. The plurality of delay devices 123 may be connected in a one-to-one manner to the plurality of transmitting antenna elements 126, and one transmitting circuit 121 may simultaneously apply transmission signals to the plurality of delay devices 123.

Each of the delay devices 123 is configured to delay a transmission signal applied from the transmitting circuit 121 and to apply the delayed transmission signal to each of the transmitting antenna elements 126 under the control of the signal processor 110. The delay device 123 may be configured in various ways. For example, the delay device 123 may include a radio frequency microelectromechanical system (RF MEMS) switch, a pin diode, or a variable capacity semiconductor diode (e.g., a varactor). Alternatively, the delay device 123 may use a microwave photonics filter, a method of applying a magnetic bias field to a ferrite material, a method of applying a voltage to a ferroelectric material, or a method of using a change in a dielectric constant of a liquid crystal. Accordingly, the delay device 123 may variably delay a transmission signal under the control of the signal processor 110.

The signal processor 110 may determine an area where an electromagnetic beam is to be emitted according to the method of FIGS. 2A through 2C and may control each of the plurality of delay devices 123 according to the determined area. Accordingly, the plurality of delay devices 123 may differently delay transmission signals according to positions where the transmitter 120 is to emit electromagnetic beams. For example, the plurality of delay devices 123 arranged in a column-wise direction may delay transmission signals so that while the transmitter 120 sequentially transmits the electromagnetic beams T11, T12, T13, etc. from the top to the bottom in the first area A1 as shown in FIG. 2A, phases of electromagnetic waves output from the plurality of transmitting antenna elements 126 arranged along one column are sequentially changed. In this manner, the signal processor 110 may control an area where the transmitter 120 transmits an electromagnetic beam.

Although only the plurality of delay devices 123 and the plurality of transmitting antenna elements 126 arranged in the column-wise direction are illustrated in FIG. 4 for convenience, the plurality of delay devices 123 and the plurality of transmitting antenna elements 126 may be arranged in a 2D formation in row and column-wise directions. The plurality of delay devices 123 are independent from one another and operate under the control of the signal processor 110. The plurality of transmitting antenna elements 126 are also independent from one another and emit electromagnetic waves according to transmission signals applied from the delay devices 123.

Figure 5:
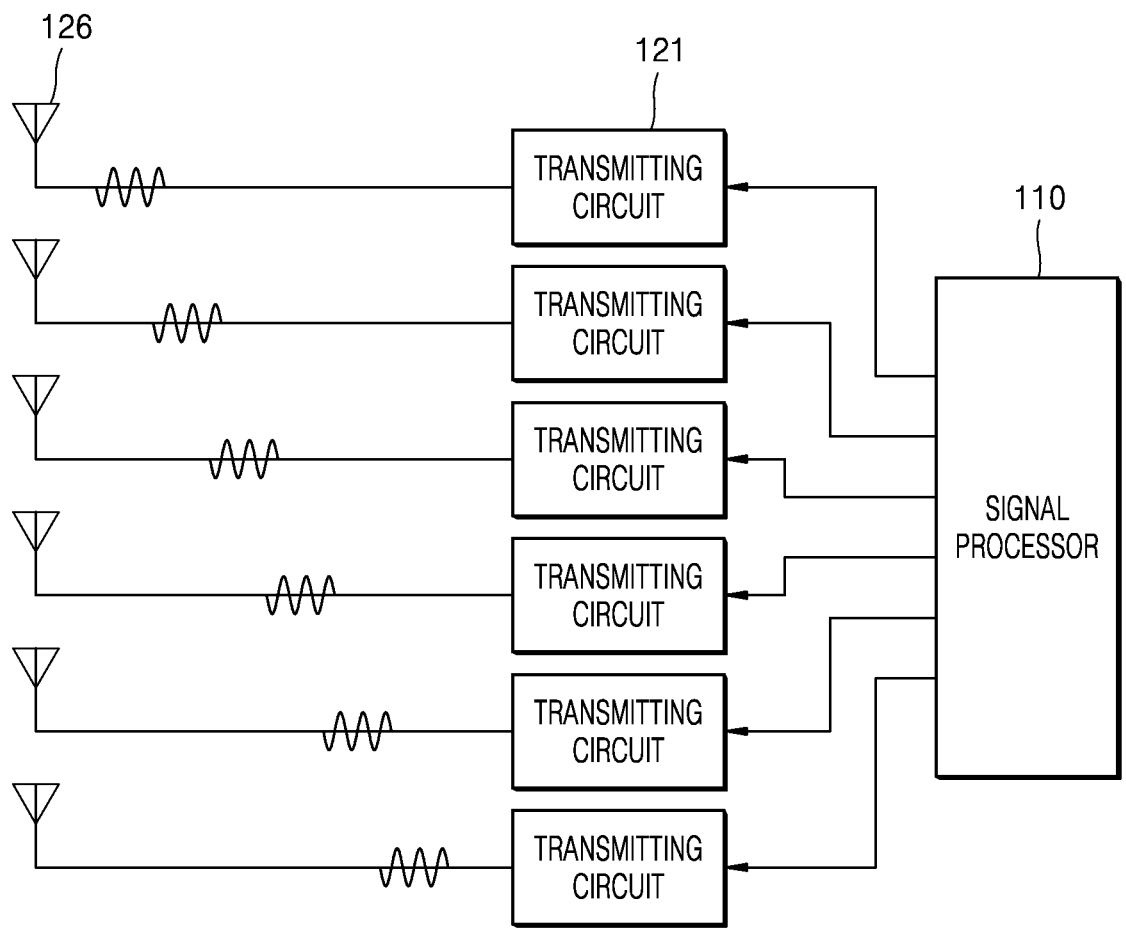
FIG. 5 is a block diagram illustrating a configuration of the transmitter according to an exemplary embodiment.

FIG. 5 is a block diagram illustrating a configuration of the transmitter 120 according to an exemplary embodiment. As shown in FIG. 5, the transmitter 120 may include a plurality of the transmitting circuits 121 that independently operate, without using the delay devices 123. The plurality of transmitting circuits 121 may be connected in a one-to-one manner to the plurality of transmitting antenna elements 126 and may independently apply transmission signals to the plurality of transmitting antenna elements 126. Also, the plurality of transmitting circuits 121 may be configured to respectively apply transmission signals having different phases to the plurality of transmitting antenna elements 126 under the control of the signal processor 110. Accordingly, a plurality of transmission signals having a phase difference may be generated by using circuitry, without needing to use the delay devices 123. The plurality of transmitting circuits 121 may also be independent from one another and may operate under the control of the signal processor 110.

The signal processor 110 may determine areas where electromagnetic beams are to be emitted according to the method of FIGS. 2A through 2C and may control the plurality of transmitting circuits 121 according to the determined areas. Accordingly, the plurality of transmitting circuits 121 may generate transmission signals having different phases according to positions where the transmitter 120 is to transmit electromagnetic beams and may apply the transmission signals to the plurality of transmitting antenna elements 126. For example, the plurality of transmitting circuits 121 arranged in the column-wise direction may respectively apply transmission signals having different phases to the plurality of transmitting antenna elements 126 so that while the transmitter 120 sequentially transmits the electromagnetic beams T11, T12, T13, etc. from the top to the bottom (i.e., in the −z direction) in the first area A1 as shown in FIG. 2A, phases of electromagnetic waves output from the plurality of transmitting antenna elements 126 arranged along one column are sequentially changed.

The receiver 130 may receive electromagnetic waves reflected from a forward environment by using a 1D scanning method. For example, the receiver 130 may receive electromagnetic waves reflected from the first area A1 while the transmitter 120 sequentially scans the electromagnetic beams T11, T12, T13, etc. in the −z direction in the first area A1. Next, in FIG. 2B, the receiver 130 may receive electromagnetic waves reflected from the second area A2 while the transmitter 120 sequentially transmits the electromagnetic beams T21, T22, T23, etc. in the −z direction in the second area A2. To this end, the signal processor 110 may control areas where the receiver 130 receives electromagnetic waves according to areas where the transmitter 120 transmits electromagnetic waves.

Figure 6:
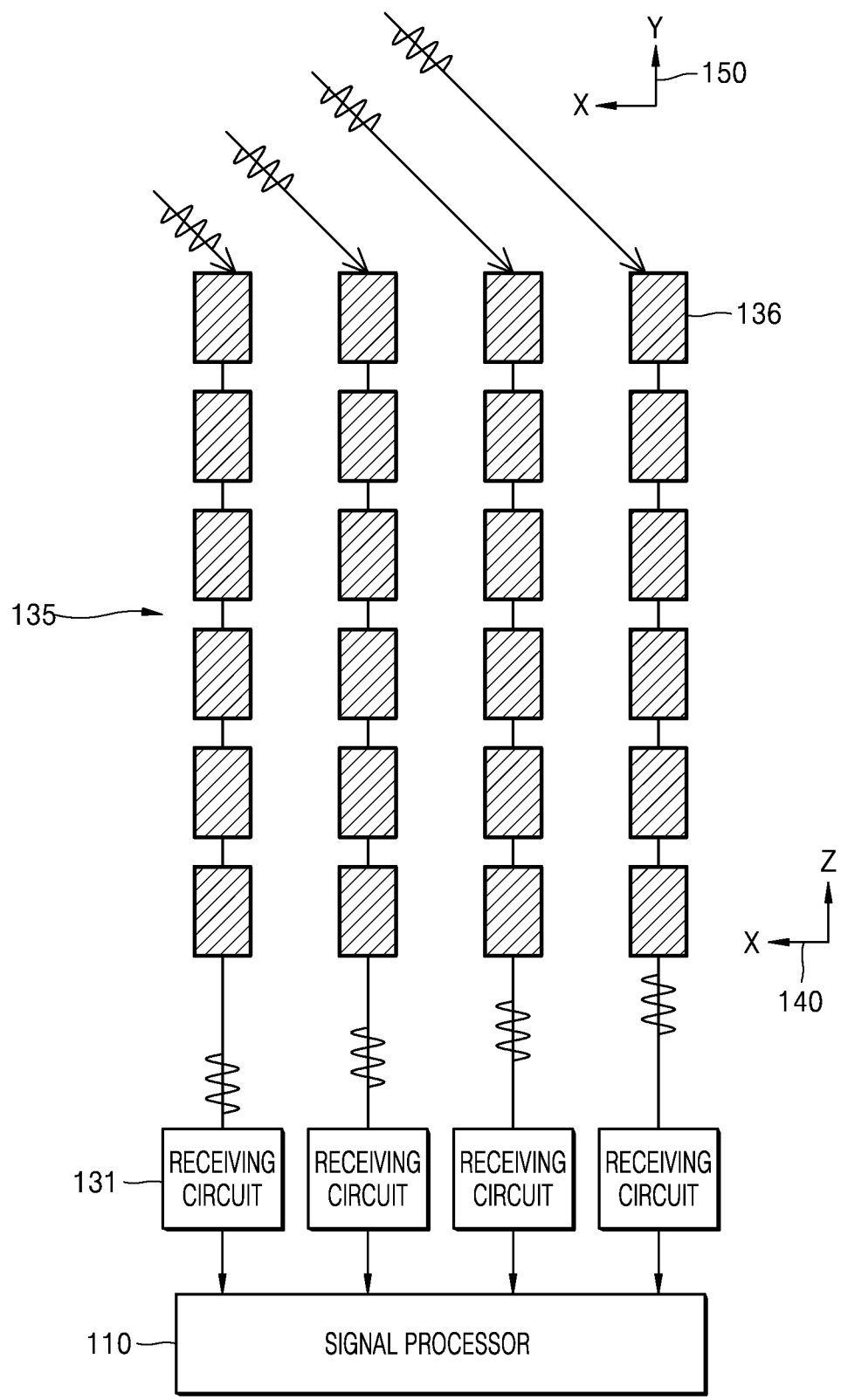
FIG. 6 is a block diagram illustrating a configuration of a receiver according to an exemplary embodiment.

For example, FIG. 6 is a block diagram illustrating a configuration of the receiver 130 according to an exemplary embodiment. As shown in FIG. 6, the receiver 130 may include the receiving antenna array 135 that includes a plurality of receiving antenna elements 136 arranged in a 2D formation and a plurality of the receiving circuits 131 that are respectively connected to the plurality of receiving antenna elements 136 and respectively apply signals received from the plurality of receiving antenna elements 136 to the signal processor 110. The plurality of receiving circuits 131 may independently receive signals and apply the signals to the signal processor 110, and may operate under the control of the signal processor 110.

The plurality of receiving antenna elements 136 may be arranged in a 2D formation along a plurality of rows and a plurality of columns. Since the receiver 130 receives electromagnetic waves by using a 1D scanning method, the plurality of receiving antenna elements 136 arranged in one direction may be electrically connected to one another. For example, in FIG. 6, the plurality of receiving antenna elements 136 arranged in a column-wise direction (i.e., along a Z axis) are connected to one another. One receiving circuit 131 may be connected to the plurality of receiving antenna elements 136 arranged along each column. In other words, one receiving circuit 131 may be located in each column. This is because the transmitter 120 scans electromagnetic beams in a vertical direction in the areas A1, A2, . . . , and An of the forward view V. However, exemplary embodiments are not limited thereto. When the transmitter 120 divides the forward view V into a plurality of horizontal areas and scans electromagnetic beams in a horizontal direction (e.g., +X direction), the plurality of receiving antenna elements 136 arranged in a row-wise direction (i.e., along an X axis) may be connected to one another. In this case, one receiving circuit 131 may be located in each row. The following will be explained just for convenience on the assumption that the plurality of receiving antenna elements 136 arranged in the column-wise direction (i.e., along a Z axis) are connected to one another.

In the receiver 130 having this structure, phases of electromagnetic waves respectively received by the plurality of receiving antenna elements 136 arranged in the row-wise direction (i.e., along an X axis) vary according to positions where electromagnetic waves are reflected or directions in which electromagnetic waves propagate. In other words, phases of electromagnetic waves received by the receiving antenna elements 136 in different columns may vary according to positions where electromagnetic waves are reflected. For example, when the transmitter 120 transmits electromagnetic waves to the first area A1 that is located on a left edge of the forward view V, the electromagnetic waves reach the receiving antenna elements 136 that are located at a leftmost column (i.e., a column furthest in the +X direction) in the receiving antenna array 135 first and reach the receiving antenna elements 136 that are located at a rightmost column (i.e. a column furthest in the −X direction) last. When the transmitter 120 transmits electromagnetic waves to a central area, the electromagnetic waves may simultaneously reach all columns in the receiving antenna array 135. Also, when the transmitter 120 transmits electromagnetic waves to the n-th area An that is located on a right edge of the forward viewing area V, the electromagnetic waves may reach the receiving antenna elements 136 that are located at a rightmost column first and may reach the receiving antenna elements 136 that are located at a leftmost column last.

Accordingly, the signal processor 110 may extract 3D information by using a digital beamforming method using signals applied from the plurality of receiving circuits 131. In detail, the signal processor 110 may control the plurality of receiving circuits 131 to accurately receive signals in consideration of a phase difference occurring when electromagnetic waves reflected from the areas A1, A2, . . . , and An are received while the transmitter 120 performs scanning on any one of the areas A1, A2, . . . , and An of the forward view V. For example, the signal processor 110 may control the receiving circuits 131 arranged along a plurality of columns to receive electromagnetic waves having a predetermined phase difference or time difference coming from the first area A1 while the transmitter 120 performs scanning on the first area A1 of the forward view V. The plurality of receiving circuits 131 may, independently, select and receive electromagnetic waves having predetermined frequencies, remove noise, convert received analog signals into digital signals, and apply the digital signals to the signal processor 110. The signal processor 110 may extract 3D information by using the digital signals applied from the plurality of receiving circuits 131.

Figure 7:
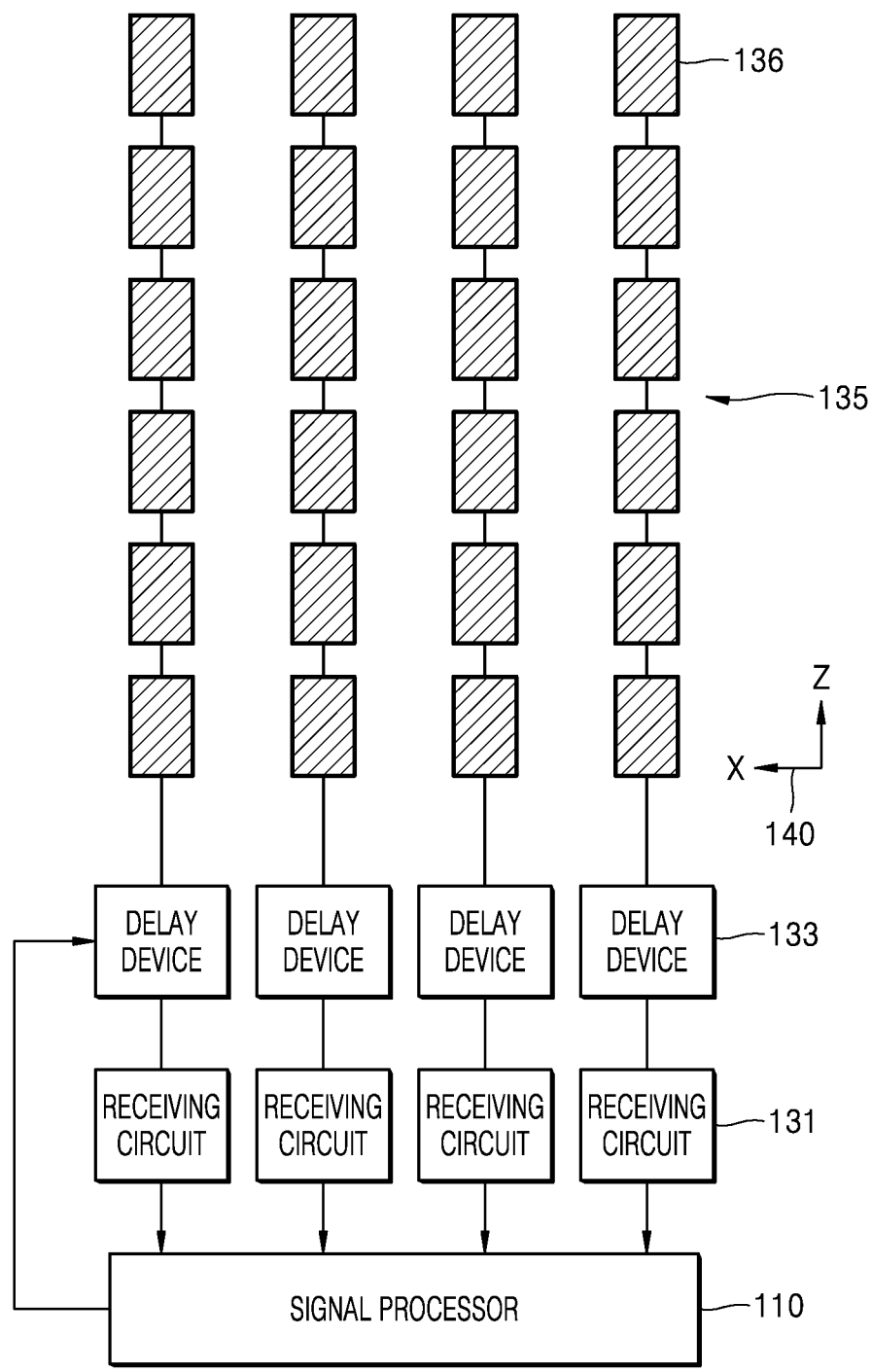
FIG. 7 is a block diagram illustrating a configuration of the receiver according to an exemplary embodiment.

FIG. 7 is a block diagram illustrating a configuration of the receiver 130 according to an exemplary embodiment. As shown in FIG. 7, the receiver 130 may further include a plurality of delay devices 133 respectively connected to the plurality of receiving antenna elements 136 arranged in a row-wise direction. That is, one delay device 133 may be connected to the plurality of receiving antenna elements 136 arranged along each column. Each of the delay devices 133 may be located between the receiving circuit 131 and the plurality of receiving antenna elements 136 arranged in a column-wise direction. The delay device 133 of the receiver 130 may be the same as the delay device 123 of the transmitter 120.

The plurality of delay devices 133 may differently delay signals received from the plurality of receiving antenna elements 136 arranged in the row-wise direction under the control of the signal processor 110. As described above, phases of electromagnetic waves received by the receiving antenna elements 136 in different columns may vary according to positions where electromagnetic waves are reflected. Accordingly, the signal processor 110 may control the plurality of delay devices 133 arranged in the row-wise direction to differently delay signals in consideration of a phase difference occurring when electromagnetic waves reflected from the areas A1, A2, . . . , and An are received while the transmitter 120 scans any one of the areas A1, A2, . . . , and An of the forward view V. To this end, the plurality of delay devices 133 may be independent from one another and may operate under the control of the signal processor 110. Accordingly, signals may almost simultaneously reach the plurality of receiving circuits 131 arranged in the row-wise direction. The plurality of receiving circuits 131 may convert analog signals that are independently received into digital signals and may apply the digital signals to the signal processor 110. The signal processor 110 may extract 3D information by using the digital signals applied from the plurality of receiving circuits 131.

Since the transmitter 120 scans electromagnetic beams at a plurality of different elevation angles in the forward view V, the vehicle radar apparatus 100 may apply 3D information including a height of a detected object as well as a distance to the object, an azimuth angle of the object, and a relative speed of the object. Accordingly, by using the vehicle radar apparatus 100, a slope (e.g., incline of the road ahead), an overhead bridge, an overpass, or an obstacle on or over the road may be detected ahead. Also, there is no need to increase an area of the receiving antenna array 135 in order to obtain 3D information. Also, since electromagnetic beams are focused and sent to the narrow areas A1, A2, . . . , and An of the forward view V, an RF chip having lower output power than that when electromagnetic waves are emitted without directivity to the forward view V may be used and noise may be reduced.

Figure 8A:
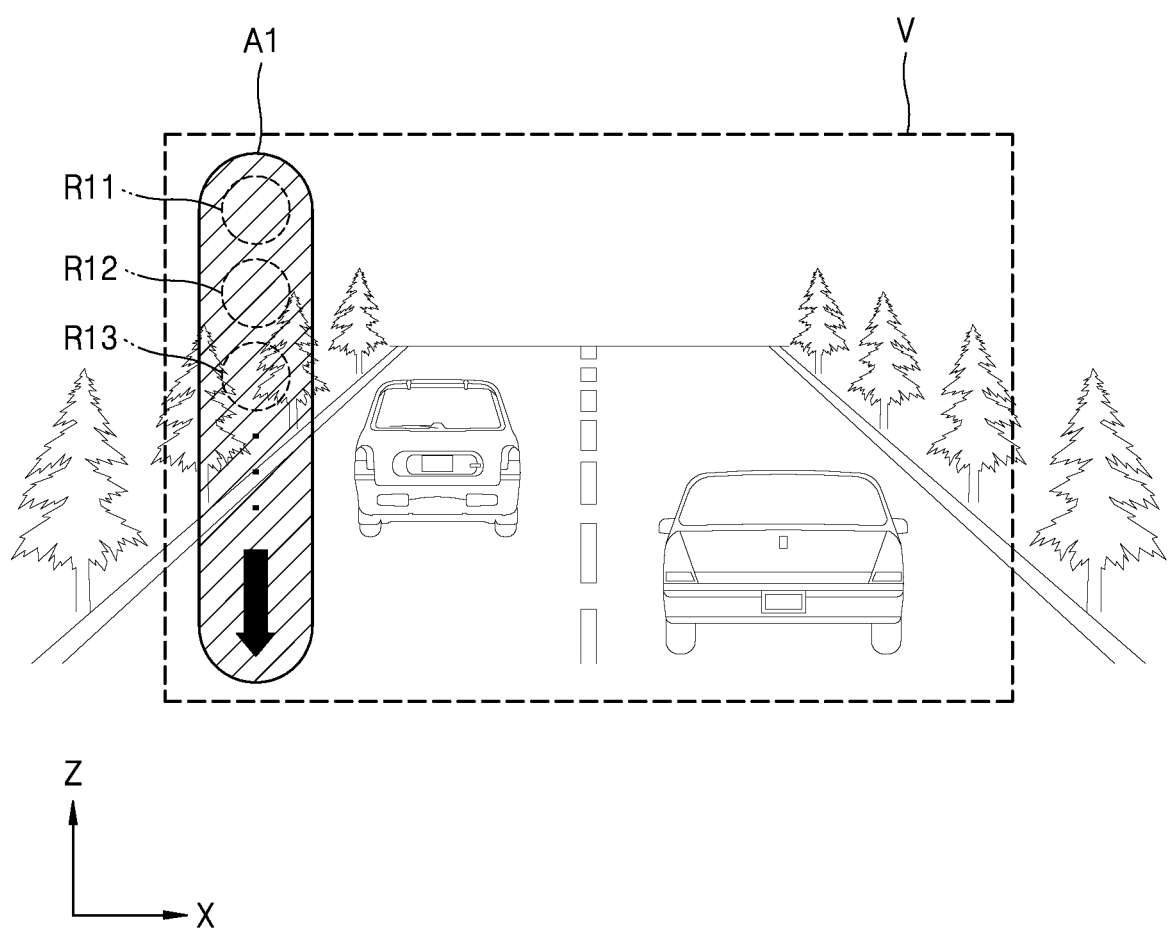
FIGS. 8A through 8C are views for explaining a process of scanning electromagnetic beams to a forward environment according to an exemplary embodiment.
Figure 8B:
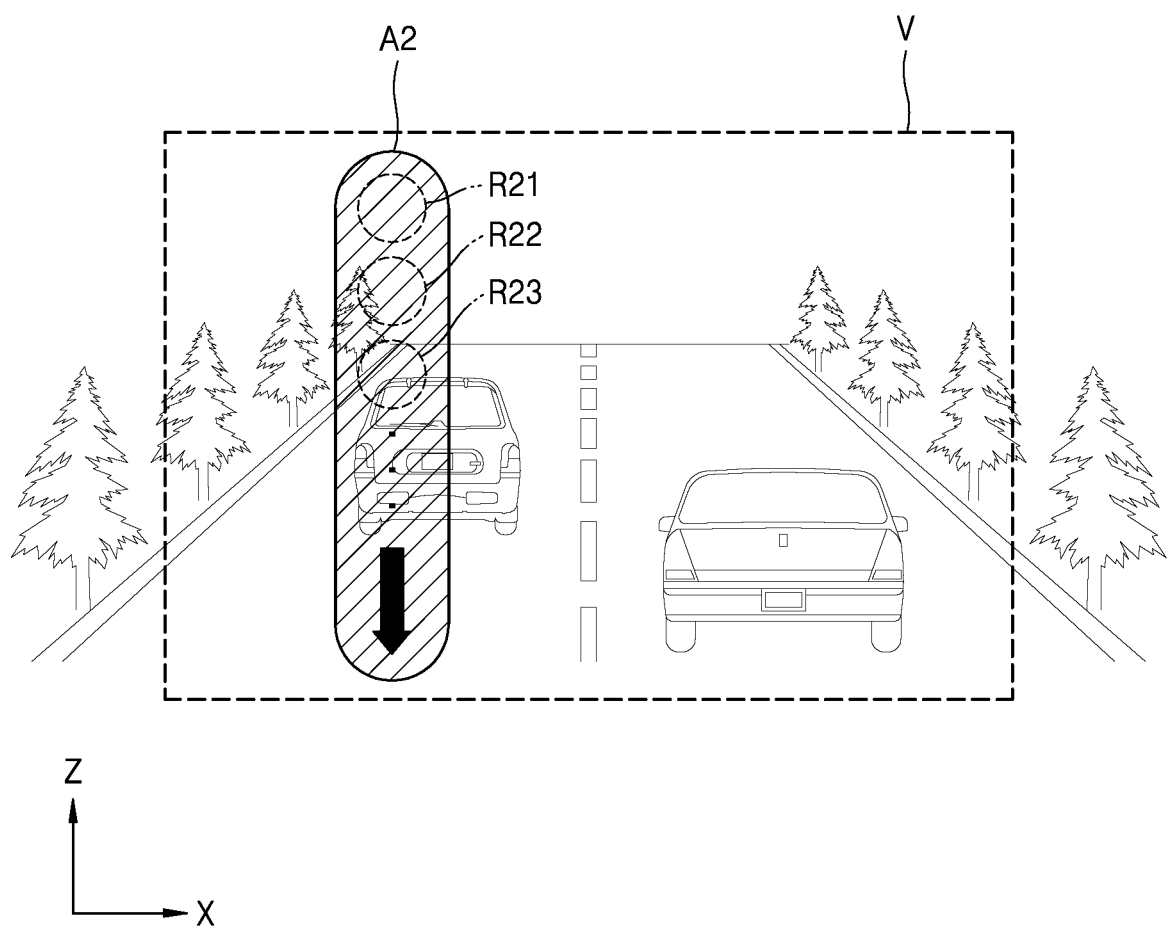
Figure 8C:
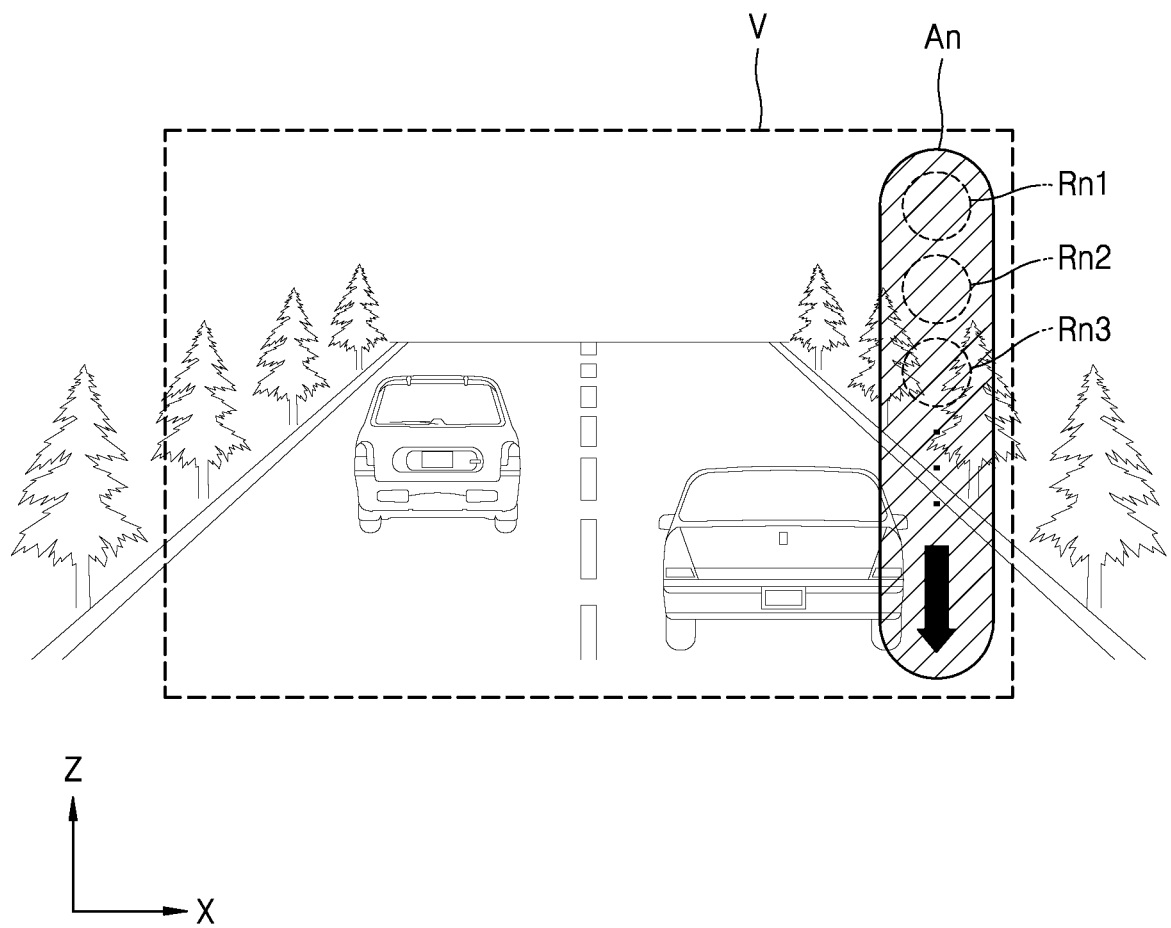

Exemplary embodiments where the transmitter 120 transmits electromagnetic waves by using a 2D scanning method to a forward environment and the receiver 130 receives reflected electromagnetic waves by using a 1D scanning method have been described. However, the transmitter 120 may transmit electromagnetic waves by using a 1D scanning method to a forward environment and the receiver 130 may receive reflected electromagnetic waves by using a 2D scanning method. For example, FIGS. 8A through 8C are views illustrating a process of scanning electromagnetic beams to a forward environment according to an exemplary embodiment. First, as shown in FIG. 8A, the transmitter 120 of the vehicle radar apparatus 100 may select the first area A1 in the forward view V and transmit electromagnetic waves to the entire first area A1. For example, the first area A1 may be located on a left edge of the forward view V and may extend in a vertical direction. While the transmitter 120 transmits electromagnetic waves to the first area A1, the receiver 130 may sequentially receive electromagnetic waves a plurality of times in the vertical direction in the first area A1. For example, the receiver 130 may sequentially receive electromagnetic waves from a plurality of areas R11, R12, and R13 from the top to the bottom (i.e., in a −z direction) or from the bottom to the top (i.e., in a +z direction) in the first area A1.

After the receiving of the electromagnetic waves in the first area A1 is completed, as shown in FIG. 8B, the transmitter 120 selects the second area A2 longitudinally adjacent to the first area A1 and transmits electromagnetic waves to the entire second area A2. During this time, the receiver 130 sequentially receives electromagnetic waves a plurality of times in the vertical direction in the second area A2. For example, the transmitter 120 moves from the first area A1 in a +x direction and simultaneously transmits electromagnetic waves to the second area A2. During this time, the receiver 130 may sequentially receive electromagnetic waves from a plurality of areas R21, R22, and R23 in the −z direction or the +z direction in the second area A2.

Finally, in FIG. 8C, the transmitter 120 may simultaneously transmit electromagnetic waves to the n-th area An that is located on a right edge of the forward view V and extends in a z direction. During the time, the receiver 130 may sequentially receive electromagnetic waves from a plurality of areas Rn1, Rn2, and Rn3 in the −z direction or the +z direction in the first n-th area An. In this manner, the scanning of the forward view V during one frame may be completed. Although electromagnetic beams are sequentially scanned from the left to the right of the forward view V in the exemplary embodiment shown in FIGS. 8A through 8C, the present disclosure is not limited thereto. For example, the transmitter 120 may transmit electromagnetic waves in an order from the n-th area An to the first area A1. Also, although the transmitter 120 sequentially transmits electromagnetic waves to areas that extend in the vertical direction in FIGS. 8A through 8C, the forward view V may be divided into a plurality of horizontal areas and electromagnetic waves may be sequentially transmitted to areas that extend in the horizontal direction.

Figure 9:
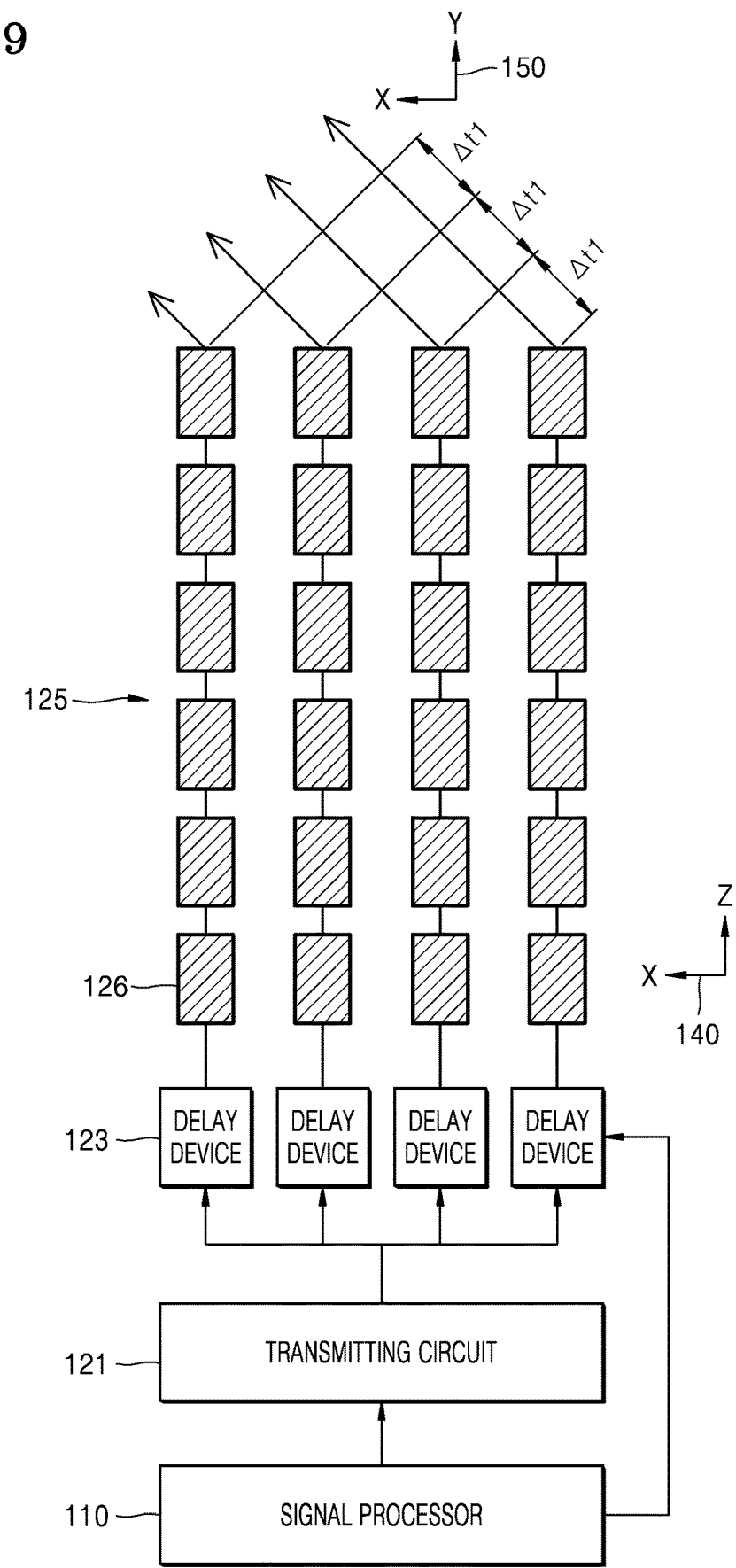
FIG. 9 is a block diagram illustrating a configuration of the transmitter for performing the process of FIGS. 8A through 8C according to an exemplary embodiment.

FIG. 9 is a block diagram illustrating a configuration of the transmitter 120 for performing the process shown in FIGS. 8A through 8C according to an exemplary embodiment. As shown in FIG. 9, the transmitter 120 may include the transmitting antenna array 125 that includes the plurality of transmitting antenna elements 126 arranged in a 2D formation, the transmitting circuit 121 that applies a transmission signal to each of the plurality of transmitting antenna elements 126, and the plurality of delay devices 123 that are connected between the transmitting circuit 121 and the plurality of transmitting antenna elements 125.

The plurality of transmitting antenna elements 126 may be arranged in a 2D formation along a plurality of rows and a plurality of columns. Since the transmitter 120 transmits electromagnetic waves by using a 1D scanning method, the plurality of transmitting antenna elements 126 arranged in one direction may be electrically connected to one another. For example, in FIG. 9, the plurality of transmitting antenna elements 126 arranged in a column-wise direction are connected to one another. One delay device 123 may be connected to the plurality of transmitting antenna elements 126 arranged along each column. In other words, one delay device 123 may be located in each column. This is because the transmitter 120 transmits electromagnetic waves to the areas A1, A2, . . . , and An that extend in a vertical direction in the forward view V. However, the present disclosure is not limited thereto. When the forward view V is divided into a plurality of horizontal areas and the transmitter 120 scans electromagnetic beams to areas that extend in a horizontal direction, the plurality of transmitting antenna elements 126 arranged in a row-wise direction may be connected to one another. In this case, one delay device 123 may be located in each row.

One transmitting circuit 121 may be connected to the plurality of delay devices 123 and may simultaneously apply transmission signals to the plurality of delay devices 123. The delay devices 123 may delay transmission signals received from the transmitting circuit 121 and may apply the delayed transmission signals to the transmitting antenna elements 126 of each column under the control of the signal processor 110. The signal processor 110 may control the plurality of delay devices 123 to differently delay transmission signals (e.g., introduce different delays to the transmission signals) according to positions where the transmitter 120 transmits electromagnetic waves. For example, when electromagnetic waves are transmitted to the first area A1 that is located on a left edge of the forward view V, the plurality of delay devices 123 may be controlled so that electromagnetic waves are emitted first from the transmitting antenna elements 126 of a rightmost column and electromagnetic waves are emitted last from the transmitting antenna elements 126 of a leftmost column.

Figure 10:
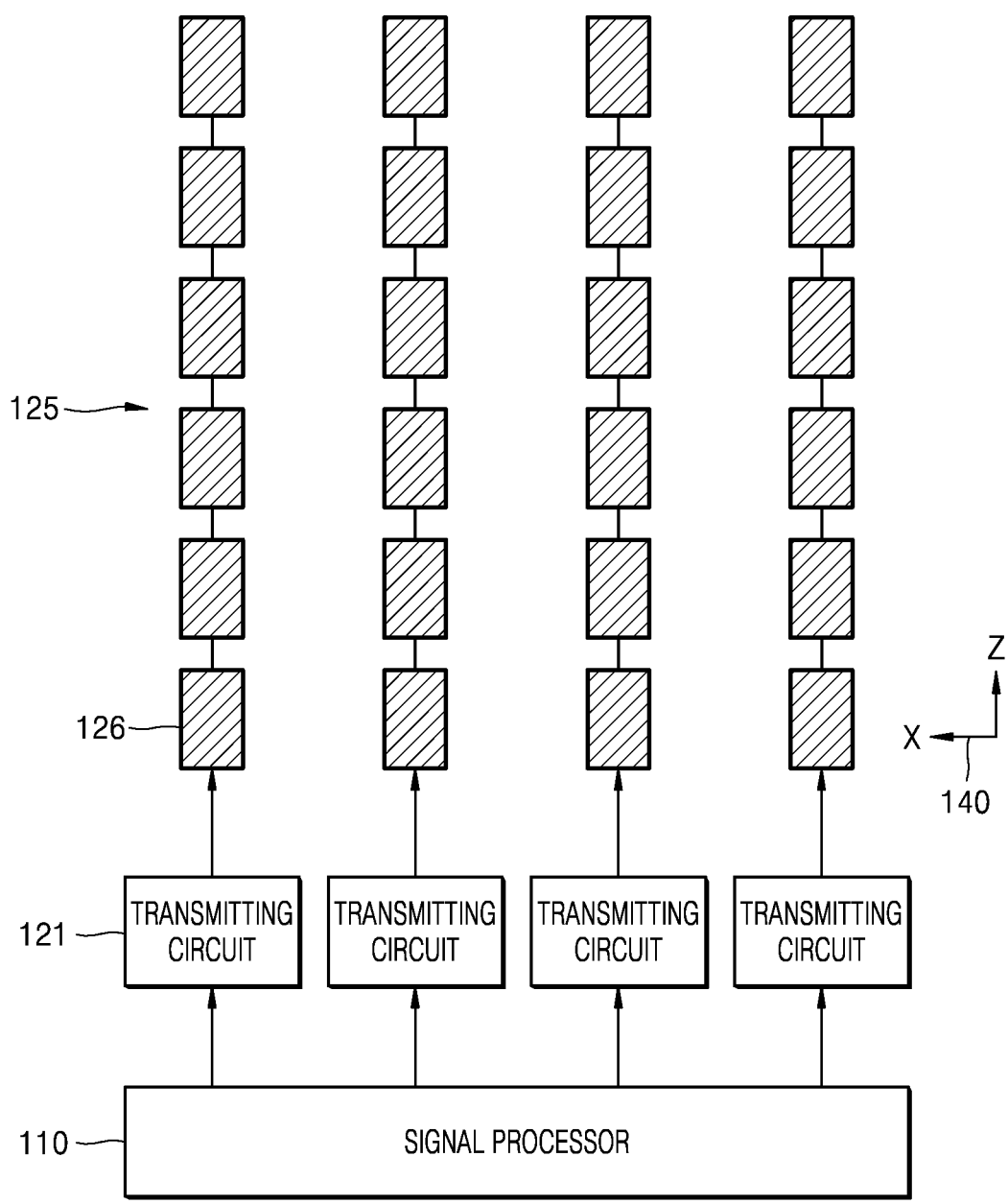
FIG. 10 is a block diagram illustrating a configuration of the transmitter for performing the process of FIGS. 8A through 8C according to an exemplary embodiment.

FIG. 10 is a block diagram illustrating a configuration of the transmitter 130 for performing the process of FIGS. 8A through 8C according to an exemplary embodiment. In FIG. 10, the transmitter 120 may include the plurality of transmitting circuits 121 that operate independently, without using the delay devices 123. For example, one transmitting circuit 121 may be connected to the plurality of transmitting antenna elements 126 arranged along each column. In other words, one transmitting circuit 121 may be located in each column. The plurality of transmitting circuits 121 may be configured to apply transmission signals having different phases to the plurality of transmitting antenna elements 126 under the control of the signal processor 110. The signal processor 110 may determine an area where electromagnetic waves are to be transmitted according to the method of FIGS. 8A through 8C and may control each of the plurality of transmitting circuits 121 according to the determined area.

Figure 11:
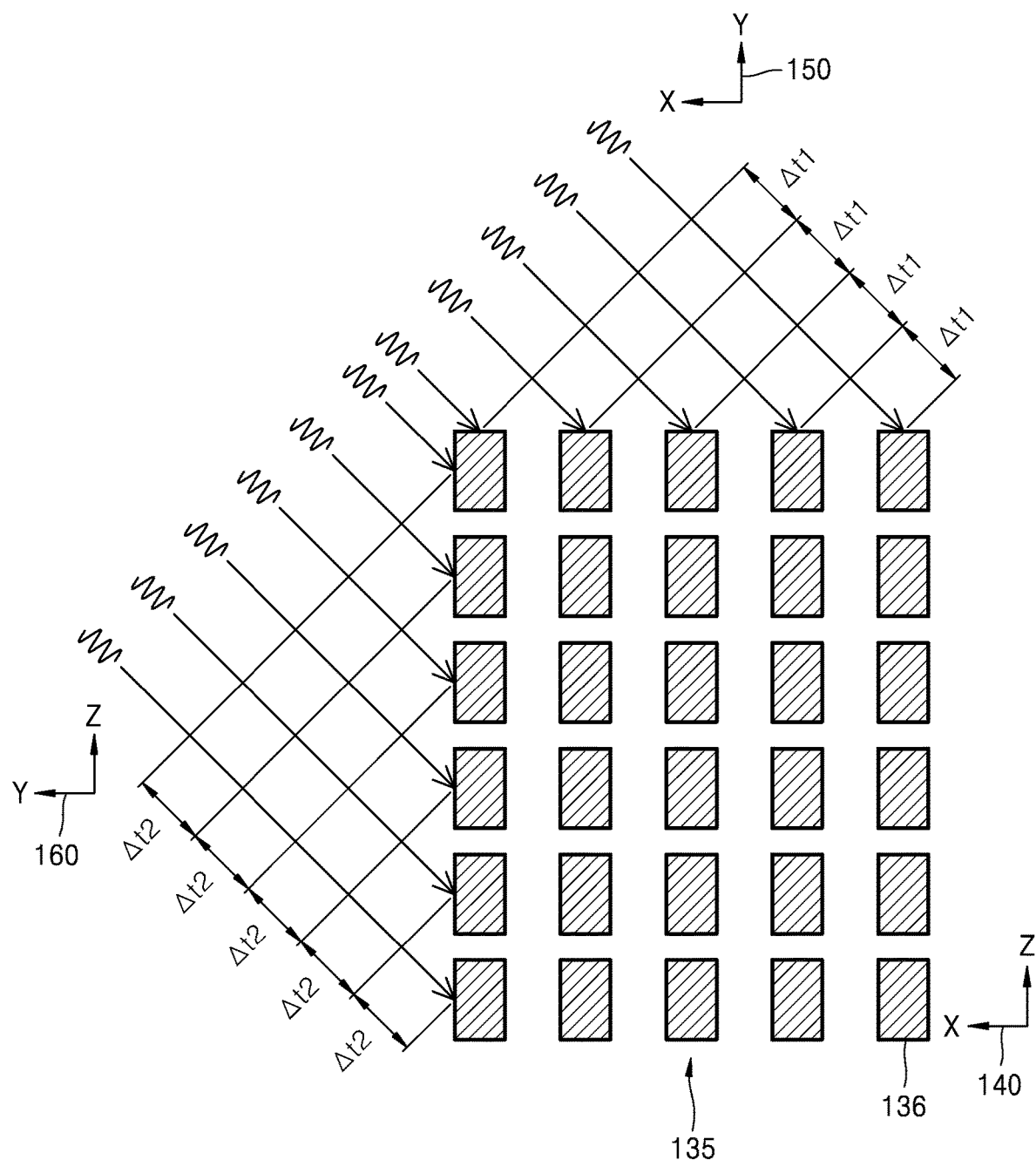
FIG. 11 is a diagram for explaining an operation of a receiving antenna array for performing the process of FIGS. 8A through 8C according to an exemplary embodiment.

FIG. 11 is a diagram for explaining an operation of the receiving antenna array 135 for performing the process of FIGS. 8A through 8C according to an exemplary embodiment. As shown in FIG. 11, the receiving antenna array 135 includes the plurality of receiving antenna elements 136 arranged in a 2D formation along a plurality of rows and a plurality of columns. Since the receiver 130 receives electromagnetic waves by using a 2D scanning method, the plurality of receiving antenna elements 136 arranged along the rows and columns may independently operate and may receive electromagnetic waves. In the receiver 130 having this structure, phases of electromagnetic waves respectively received by the plurality of receiving antenna elements 136 arranged in row-wise and column-wise directions vary according to positions where electromagnetic wave are reflected or directions in which electromagnetic waves propagate.

For example, when an electromagnetic wave is received from the area R11 that is located at an uppermost position in the first area A1 that is located on a left edge of the forward view V, the electromagnetic wave reaches the receiving antenna element 136 that is located at a leftmost column in one row first and reaches the receiving antenna element 136 that is located at a rightmost column last. Also, the electromagnetic wave reaches the receiving antenna element 136 that is located at an uppermost row in one column first and reaches the receiving antenna element 136 that is located at a lowermost row last. In other words, a phase difference between electromagnetic waves received by the plurality of receiving antenna elements 136 arranged along one row varies according to an azimuth direction in which electromagnetic waves propagate, and a phase difference between electromagnetic waves received by the plurality of receiving antenna elements 136 arranged along one column varies according to an elevation direction in which electromagnetic waves propagate. Accordingly, electromagnetic waves reflected in desired azimuth and elevation directions may be selected by receiving electromagnetic waves having an appropriate time difference or phase difference in the row-wise and column-wise directions from the plurality of receiving antenna elements 136.

Figure 12:
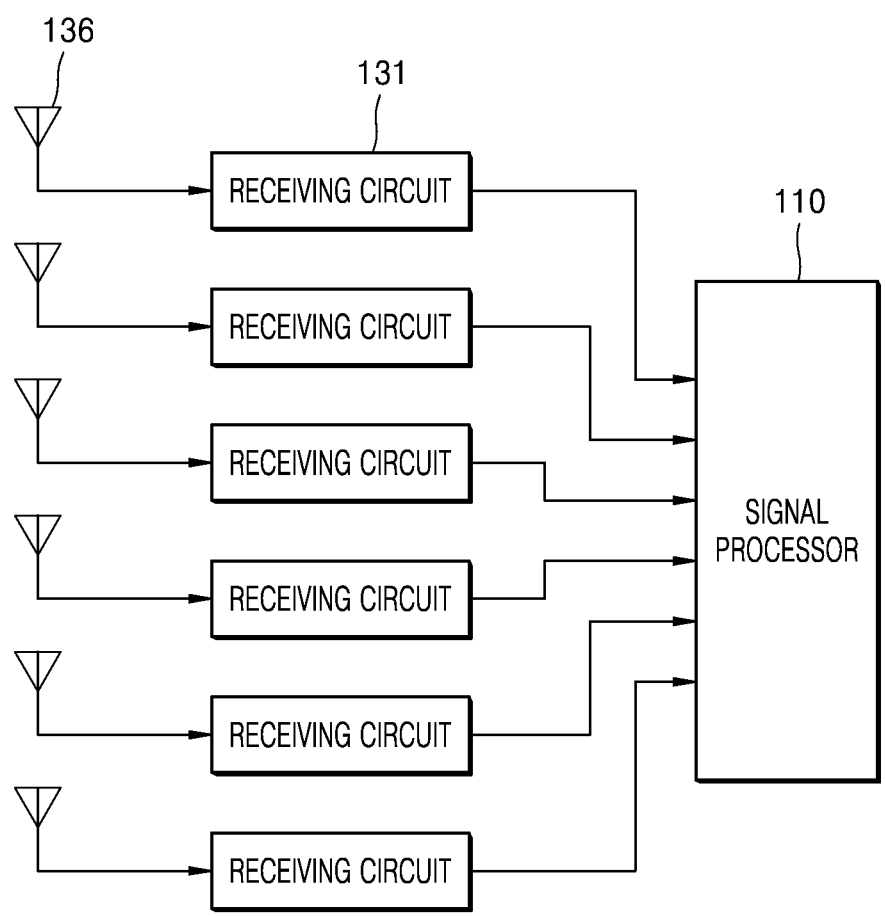
FIG. 12 is a block diagram illustrating a configuration of the receiver for performing the process of FIGS. 8A through 8C according to an exemplary embodiment.

FIG. 12 is a block diagram illustrating a configuration of the receiver 130 for performing the process of FIGS. 8A through 8C according to an exemplary embodiment. As shown in FIG. 12, the receiver 130 may include the plurality of receiving circuits 131 that are respectively connected to the plurality of receiving antenna elements 136 and apply signals received from the plurality of receiving antenna elements 136 to the signal processor 110. The plurality of receiving circuits 131 may be connected in a one-to-one manner to the plurality of receiving antenna elements 136, and may independently receive signals and may apply the signals to the signal processor 110. Also, the plurality of receiving circuits 131 may respectively receive signals having different phases from the plurality of receiving antenna elements 136 under the control of the signal processor 110. For example, the plurality of receiving circuits 131 may select and receive electromagnetic waves reflected from desired positions under the control of the signal processor 110. Accordingly, the signal processor 110 may extract 3D information by using a digital beamforming method using signals applied from the plurality of receiving circuits 131. Although only the receiving circuits 131 of a plurality of rows and the receiving antenna elements 136 of a plurality of rows arranged along one column are illustrated in FIG. 12 for convenience, the plurality of receiving circuits 131 and the plurality of receiving antenna elements 136 may be arranged in a 2D formation in row-wise and column-wise directions.

Figure 13:
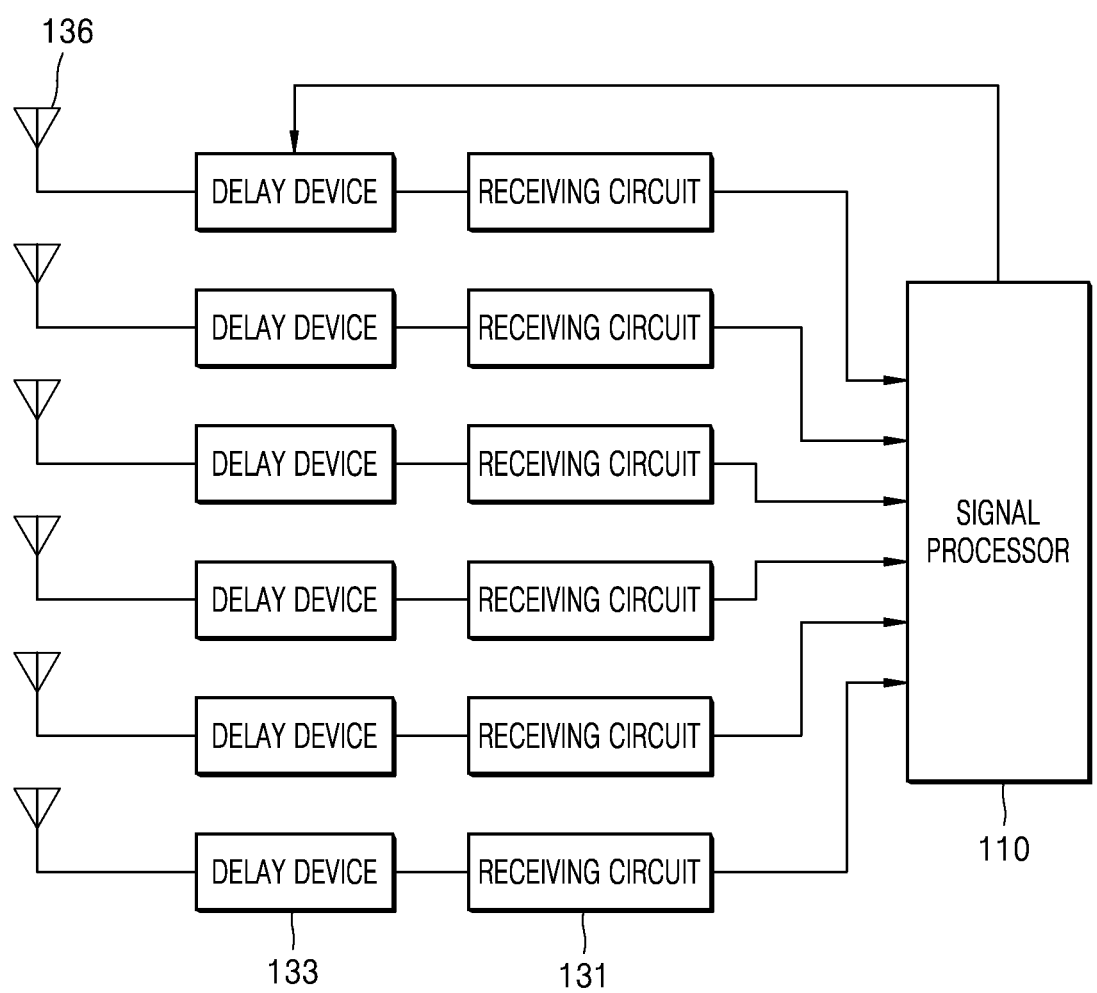
FIG. 13 is a block diagram illustrating a configuration of the receiver for performing the process of FIGS. 8A through 8C according to an exemplary embodiment.

FIG. 13 is a block diagram illustrating a configuration of the receiver 130 for performing the process of FIGS. 8A through 8C according to an exemplary embodiment. As shown in FIG. 13, the receiver 130 may further include the plurality of delay devices 133 respectively connected between the plurality of receiving antenna elements 136 and the plurality of receiving circuits 131. The delay devices 133 of the receiver 130 may be the same as the delay devices 123 of the transmitter 120. Although only the delay devices 133 respectively connected to the receiving antenna elements 136 of a plurality of columns arranged along one column are illustrated in FIG. 13 for convenience, the delay devices 133 may be connected in a one-to-one manner to the plurality of receiving antenna elements 136 arranged in a 2D formation in row-wise and column-wise directions, and the plurality of delay devices 133 may operate independently.

The plurality of delay devices 133 may differently delay signals (e.g., introduce different delays to the signals) received from the plurality of receiving antenna elements 136 arranged in the row-wise and column-wise directions under the control of the signal processor 110. Accordingly, signals may almost simultaneously reach the plurality of receiving circuits 131. The plurality of delay devices 133 may select electromagnetic waves reflected from specific positions of a forward environment according to extents to which signals are delayed in the row-wise and column-wise directions under the control of the signal processor 110. Next, the plurality of receiving circuits 131 may convert analog signals that are independently received into digital signals and may apply the digital signals to the signal processor 110. The signal processor 110 may extract 3D information regarding the forward environment by using the digital signals applied from the plurality of receiving circuits 131.

While the present disclosure has been particularly shown and described with reference to various exemplary embodiments thereof, the exemplary embodiments have merely been used to explain the present disclosure and should not be construed as limiting the scope of the present disclosure as defined by the claims. The exemplary embodiments should be considered in a descriptive sense only and not for purposes of limitation. Therefore, the scope of the present disclosure is defined not by the detailed description of the present disclosure but by the appended claims, and all differences within the scope will be construed as being included in the present disclosure.

What is claimed is:

1. A radar apparatus comprising:
   a transmitter configured to transmit electromagnetic waves to an environment by performing a two-dimensional (2D) scan;
   a receiver configured to receive reflected electromagnetic waves by performing a one-dimensional (1D) scan; and
   a signal processor configured to extract three-dimensional (3D) information about the environment based on the reflected electromagnetic waves received by the receiver,
   wherein the transmitter is further configured to sequentially transmit the electromagnetic waves a first plurality of times in a first direction in a first area within the environment, and sequentially transmit the electromagnetic waves a second plurality of times in the first direction in a second area within the environment after transmitting the electromagnetic waves in the first area, the second area being adjacent to the first area along a second direction perpendicular to the first direction.

2. The radar apparatus of claim 1,
   wherein the receiver is further configured to receive the reflected electromagnetic waves from the first area while the transmitter sequentially scans the electromagnetic waves to the first area, and receive the reflected electromagnetic waves from the second area while the transmitter sequentially scans the electromagnetic waves to the second area.

3. The radar apparatus of claim 1, wherein the signal processor is further configured to control the transmitter to transmit the electromagnetic waves to an area within the environment, and control the receiver to receive the reflected electromagnetic waves from the area.

4. The radar apparatus of claim 1, wherein the transmitter comprises:
   a transmitting antenna array comprising a plurality of transmitting antenna elements arranged in a 2D formation;
   a transmitting circuit configured to respectively apply transmission signals to the plurality of transmitting antenna elements; and
   a plurality of delay devices connected between the transmitting circuit and the plurality of transmitting antenna elements,
   wherein the plurality of delay devices are configured to delay the transmission signals applied from the transmitting circuit and respectively transmit the delayed transmission signals to the transmitting antenna elements.

5. The radar apparatus of claim 4, wherein the plurality of delay devices are further configured to delay the transmission signals by different delay amounts according to respective positions of the plurality of transmitting antenna elements.

6. The radar apparatus of claim 4, wherein the plurality of transmitting antenna elements and the plurality of delay devices are arranged in a 2D formation in a first direction and a second direction, and
   wherein the plurality of delay devices arranged in the first direction are configured to delay the transmission signals so that while the transmitter sequentially transmits the electromagnetic waves in the first direction, phases of the electromagnetic waves output from the plurality of transmitting antenna elements arranged in the first direction are sequentially changed.

7. The radar apparatus of claim 1, wherein the transmitter comprises:
   a transmitting antenna array comprising a plurality of transmitting antenna elements arranged in a 2D formation; and
   a plurality of independent transmitting circuits respectively connected to the plurality of transmitting antenna elements and configured to respectively apply transmission signals to the plurality of transmitting antenna elements,
   wherein the plurality of independent transmitting circuits are further configured to respectively apply the transmission signals having different phases to the plurality of transmitting antenna elements.

8. The radar apparatus of claim 7, wherein the plurality of independent transmitting circuits are further configured to respectively apply the transmission signals having the different phases to the plurality of transmitting antenna elements according to respective positions of the plurality of transmitting antenna elements.

9. The radar apparatus of claim 7, wherein the plurality of transmitting antenna elements are arranged in the 2D formation in a first direction and a second direction, and
   wherein the plurality of independent transmitting circuits are configured to respectively apply the transmission signals to the plurality of transmitting antenna elements so that while the transmitter sequentially transmits the electromagnetic waves in the first direction, phases of the electromagnetic waves output from the plurality of transmitting antenna elements arranged in the first direction are sequentially changed.

10. The radar apparatus of claim 1, wherein the receiver comprises:
    a receiving antenna array comprising a plurality of receiving antenna elements arranged in a 2D formation; and
    a receiving circuit connected to each of the plurality of receiving antenna elements and configured to transmit signals, received from the plurality of receiving antenna elements, to the signal processor.

11. The radar apparatus of claim 10, wherein the plurality of receiving antenna elements are arranged in a first direction and a second direction, and wherein the plurality of receiving antenna elements arranged in the first direction are electrically connected to one another.

12. The radar apparatus of claim 11, wherein the receiving circuit comprises a plurality of independent receiving circuits respectively connected to the plurality of receiving antenna elements arranged in the second direction.

13. The radar apparatus of claim 12, wherein the signal processor is further configured to extract the 3D information by performing digital beamforming using the signals transmitted by the plurality of independent receiving circuits.

14. The radar apparatus of claim 11, wherein the receiver further comprises a plurality of delay devices respectively connected to the plurality of receiving antenna elements arranged in the second direction, and
wherein the plurality of delay devices are configured to delay signals received from the plurality of receiving antenna elements arranged in the second direction by different delay amounts.

15. The radar apparatus of claim 1, wherein the 3D information extracted by the signal processor comprises at least one of a distance to an object in the environment, an azimuth angle of the object, a relative speed of the object with respect to the radar apparatus, and a height of the object.

16. A radar apparatus comprising:
a transmitter configured to transmit electromagnetic waves to an environment by performing a one-dimensional (1D) scan;
a receiver configured to receive reflected electromagnetic waves by performing a two-dimensional (2D) scan; and
a signal processor configured to extract three-dimensional (3D) information about the environment based on the reflected electromagnetic waves received by the receiver, and
wherein the receiver is further configured to sequentially receive the reflected electromagnetic waves a first plurality of times in the first direction in the first area while the transmitter transmits the electromagnetic waves to the first area, and sequentially receive the reflected electromagnetic waves a second plurality of times in the first direction in the second area while the transmitter transmits the electromagnetic waves to the second area after receiving the electromagnetic waves in the first area, the second area being adjacent to the first area along a second direction perpendicular to the first direction.

17. The radar apparatus of claim 16, wherein the transmitter is further configured to simultaneously transmit the electromagnetic waves to a first area extending in a first direction within the environment, and simultaneously transmit the electromagnetic waves to a second area extending in the first direction within the environment, the second area being adjacent to the first area along a second direction perpendicular to the first direction.

18. The radar apparatus of claim 16, wherein the transmitter comprises:
a transmitting antenna array comprising a plurality of transmitting antenna elements arranged in a 2D formation;
a transmitting circuit configured to apply transmission signals to the plurality of transmitting antenna elements; and
a plurality of delay devices connected between the transmitting circuit and the plurality of transmitting antenna elements,
wherein the plurality of delay devices are configured to delay the transmission signals applied from the transmitting circuit and respectively transmit the delayed transmission signals to the plurality of transmitting antenna elements, and delay the transmission signals by different delay amounts according to respective positions of the plurality of transmitting antenna elements.

19. The radar apparatus of claim 18, wherein the plurality of transmitting antenna elements are arranged in the 2D formation in a first direction and a second direction,
wherein the plurality of transmitting antenna elements arranged in the first direction are electrically connected to one another, and
wherein the plurality of delay devices are respectively connected to the plurality of transmitting antenna elements arranged in the second direction.

20. The radar apparatus of claim 16, wherein the receiver comprises:
a receiving antenna array comprising a plurality of receiving antenna elements arranged in a 2D formation; and
a receiving circuit connected to each of the plurality of receiving antenna elements and configured to transmit signals, received from the plurality of receiving antenna elements, to the signal processor.

21. The radar apparatus of claim 20, wherein the plurality of receiving antenna elements are arranged in the 2D formation in a first direction and a second direction, and
wherein the plurality of receiving antenna elements are further configured to independently receive electromagnetic waves.

22. The radar apparatus of claim 20, wherein the receiving circuit further comprises a plurality of independent receiving circuits respectively connected to the plurality of receiving antenna elements arranged in the 2D formation.

23. The radar apparatus of claim 22, wherein the signal processor is further configured to extract the 3D information by performing digital beamforming using the signals transmitted by the plurality of independent receiving circuits.

24. The radar apparatus of claim 20, wherein the receiver further comprises a plurality of delay devices respectively connected to the plurality of receiving antenna elements arranged in the 2D formation, and
wherein the plurality of delay devices are configured to delay the signals received from the plurality of receiving antenna elements by different delay amounts.

25. The radar apparatus of claim 16, wherein the 3D information extracted by the signal processor comprises at least one of a distance to an object in the environment, an azimuth angle of the object, a relative speed of the object with respect to the radar apparatus, and a height of the object.

* * * * *